United States Patent
Gardner

(10) Patent No.: US 6,891,478 B2
(45) Date of Patent: May 10, 2005

(54) METHODS AND APPARATUS FOR CONTROLLING ELECTRIC APPLIANCES DURING REDUCED POWER CONDITIONS

(76) Inventor: Jay Warren Gardner, 9 Walker Rd. #6, North Andover, MA (US) 01845

( * ) Notice: Subject to any disclaimer, the term of this patent is extended or adjusted under 35 U.S.C. 154(b) by 334 days.

(21) Appl. No.: 09/877,809

(22) Filed: Jun. 7, 2001

(65) Prior Publication Data

US 2002/0024332 A1 Feb. 28, 2002

Related U.S. Application Data

(60) Provisional application No. 60/246,700, filed on Nov. 9, 2000, and provisional application No. 60/210,388, filed on Jun. 9, 2000.

(51) Int. Cl.[7] .............................................. G08B 21/00
(52) U.S. Cl. ........................ 340/635; 340/638; 340/644; 340/664; 307/11; 307/35; 307/38
(58) Field of Search ................................ 340/635, 638, 340/644, 664; 307/11, 35, 38

(56) References Cited

U.S. PATENT DOCUMENTS

| 4,060,709 A | 11/1977 | Hanson |
|---|---|---|
| 4,200,862 A | 4/1980 | Campbell |
| 4,321,508 A | 3/1982 | Adler |
| 4,324,987 A | 4/1982 | Sullivan |
| 4,418,333 A | 11/1983 | Schwarzbach |
| 4,471,232 A * | 9/1984 | Peddie et al. .................. 307/40 |
| 4,628,440 A | 12/1986 | Thompson |
| 4,638,299 A | 1/1987 | Campbell |
| 4,644,320 A | 2/1987 | Carr |
| 4,771,185 A | 9/1988 | Feron |
| 4,916,328 A | 4/1990 | Culp |
| 5,185,705 A | 2/1993 | Farrington |
| 5,268,850 A | 12/1993 | Skoglund |
| 5,430,430 A | 7/1995 | Gilbert |
| 5,436,510 A | 7/1995 | Gilbert |
| 5,497,332 A | 3/1996 | Allen |
| 5,880,677 A | 3/1999 | Lestician |
| 5,982,098 A | 11/1999 | Redgate |
| 6,018,690 A | 1/2000 | Saito |

* cited by examiner

Primary Examiner—Julie Bichngoc Lieu

(57) ABSTRACT

An electric power monitoring system includes a source monitor for measuring momentary power output of an electric source supplying electric power to a power distribution system having at least one electric load. The momentary power output is compared with a reference load capability for the electric source to determine the ability of the electric source to support additional load, and load capability data is transmitted based on the load capability. At least one load control receives the transmitted load capability data and controls the supply of power to the at least one corresponding electric load based on the load capability data.

23 Claims, 12 Drawing Sheets

METHODS AND APPARATUS FOR CONTROLLING ELECTRIC APPLIANCES DURING REDUCED POWER CONDITIONS

RELATED APPLICATIONS

This application claims the benefit of U.S. Provisional Application No. 60/210,388, and U.S. Provisional Application No. 60/246,700, Methods and Apparatus for Controlling Electric Appliances During Reduced Power Conditions, Filed Jun. 9, 2000 and Nov. 9, 2000 respectively. The contents of which are incorporated herein by reference, in their entirety.

BACKGROUND OF THE INVENTION

There are numerous systems for controlling the use of electricity from an electric utility; the intent being to avoid the surcharges or rate increases that can be imposed when usage levels exceed thresholds for more than a brief period. Predominantly, these systems use a central processor that controls the shedding or adding of electrical appliances in order to avoid exceeding the threshold for a period long enough to trigger an increase in billing rate. These systems frequently require the system to be programmed with sequences for shedding and adding loads depending on the user's priorities and preferences. Also, given that all loads are controlled by one central processor; the physical addition or removal of an appliance from the facility frequently requires a reprogramming of the sequence.

SUMMARY OF THE INVENTION

The objective of this invention is to address the needs of a consumer running his home on a generator, these needs being based on the fact that the power source's rated capacity, or threshold, is far less forgiving than a targeted utility threshold. When a utility-defined threshold is exceeded, a consumer pays a higher rate for electricity. In the case of a generator, when the threshold is exceeded, the circuit breaker trips, and the facility is without power. The present invention addresses the user's need to maintain the facility's total load below the generator capacity and avoid the inconvenience of bringing the generator back on line after a circuit breaker trips. This is accomplished with multiple devices, each performing independent decision processes that provide a form of artificial intelligence without the need for central control or complicated programming. The artificial intelligence simplifies the installation of the system, the process of adding or removing appliances to and from the system, and the process of changing the power source for a unit of different capacity. The word "generator" in this embodiment is used in the generic sense to refer to a limited power source including, but not limited to, a combustion engine driven generator, a fuel cell generator, or a renewable energy source such as a solar generator or wind powered generator. An additional embodiment of the invention, addresses the condition where the power from a utility generator or distributed generating facility, is lower than normal levels.

Each device in the system executes its own decision process, making the size and extent of the system dependent only on the level of control desired by the user. A home with a large generator could have a small number of such devices installed on a few of the largest appliances to avoid these large loads from turning on when the generator is near its capacity, thereby preventing these large appliances from tripping the circuit breaker. A small generator could have many such devices employed to make maximum use of the generator's limited power and ensure that most or all the appliances do not overload the generator's capacity. Given the flexibility of the system, the devices can also be used to manage utility power and eliminate high loads during those times when power is in high demand and utilities are approaching brown out conditions or having to resort to rolling black outs. The functions and decision processes of the devices in this invention create building blocks that can be used in numerous ways to custom design a power control system.

The embodiment of the invention includes one or more monitoring devices, referred to as "Generator Monitors" which measure the momentary power being used by the home or facility. These generator monitors calculate the remaining power available from the generator and then transmit this available power to the other devices in the system. Each generator monitor transmits the available power to either all or a select group of devices that control the use of electricity in the home. The other devices in the system, are either an "Interrupt Switch" which controls the power delivered to appliances that turn themselves on and off automatically, or a "User Display" which reports the available power to users that turn on appliances manually, allowing the user to make informed decisions as to whether the appliance can be turned on without overloading the generator. The generator monitors are programmed with the maximum power allowed for the group of appliances monitoring the available power transmissions. The available power is defined as GAP for Generator Available Power. If all the appliances in the home are to have access to the full capacity of the generator, then one generator monitor is configured. If the user decides to allocate a percentage of the generator capacity to a group of appliances (i.e. water pump, furnace and refrigerator) and allocate the balance of the generator capacity to the remaining appliances, then two generator monitors are configured. Multiple generator monitors provide the user a greater level of control over the generator's power.

The embodiment of the invention uses interrupt switches to deny power to appliances that turn themselves on and off automatically, when GAP or available power levels are low. The invention informs users, via user displays, of the momentary GAP levels, along with the power needed to activate appliances in the area local to the user display. When GAP levels remain low for extended periods of time and interrupt switches deny power, keeping the supported appliances disabled for extended time periods, the interrupt switches transmit the disabled condition to user displays for reporting to users. Users can then turn off other appliances, freeing up generating capacity, allowing the GAP levels to rise and for the interrupt switches to return power and enable their appliances.

The embodiment of the invention provides for appliances with operating cycles of varying loads during the cycle. Given the generator monitor measures momentary load and transmits GAP levels on an ongoing basis, a provision for varying load levels in the operating cycle of an appliance such as a washing machine or dishwasher, needs an additional process to accommodate its power requirements. The present invention allows for a "power request" that instructs the generator monitor to lower the reference outputs, from which GAP levels are calculated, by a load level equal to the maximum load of the appliance with the varying load cycle, and to maintain this reference output reduction for a time period equal to or greater than the duration of the varying load cycle.

In one aspect, the present invention is directed to an electric power monitoring system. The system comprises a source monitor for measuring momentary power output of an electric source supplying electric power to a power distribution system having at least one electric load. Comparing means compare the momentary power output with a reference load capability for the electric source to determine the ability of the electric source to support additional load, and transmit load capability data based on the load capability. At least one load control receives the transmitted load capability data and controls the supply of power to the at least one corresponding electric load based on the load capability data.

In a preferred embodiment, the reference load capability is determined based on at least one of a reference surge load and a reference continuous load. The reference surge load or reference continuous load are programmable according to time of day.

The source monitor may comprise multiple source monitors, and the means for comparing may compare the momentary power output with multiple reference load capabilities, and transmit multiple load capability data to respective multiple loads according to unique load identifiers.

The reference load is preferably adjusted in accordance with electric source drive capability, electric source efficiency, or predetermined load patterns, during a power source initialization.

The at least one load control may comprise an interrupt switch for interrupting the supply of power to the electric load when the transmitted load capability is less than a predetermined level. The interrupt switch interrupts the supply of power for an interrupt time period upon the return of power following a power failure condition. The interrupt time period is preferably set to delay the return of power for a period of time for the purpose of reducing the total sudden load on the main power source at initial power return. The interrupt switch may further monitor electric power levels drawn by the at least one electric load and interrupt the supply of power to the electric load when the transmitted load capability is less than the monitored power levels of the at least one electric load. The interrupt switch may further delay interruption of the supply of power until the electric load has completed an operation cycle and may further delay interruption of the supply of power until the electric load has completed an operation cycle if the electric load's continuous load level is substantially equal to a predetermined level of normal operation.

The interrupt switch preferably further comprises a signal transmission system that transmits interrupt switch identifier data and interrupt switch status data. A switch open status is transmitted when the switch is open and a switch closed status is transmitted just prior to closing the switch for transmitting status data when the corresponding electric load is without power and thereby unable to emit any electromagnetic interference that would compromise the interrupt switch status transmission.

The system may further comprise a user interface indicating a condition of whether the electric source has sufficient load capability for supplying electrical power to the at least one electric load. The user interface receives and displays data from the at least one load control related to the electric load level, and interprets a first difference in surge load capability in excess of the continuous load capability and compares this difference to a second difference between a start up surge and continuous load of electric load and determines a power level reported to the user on the interface. The user interface may also report the interrupt switch status data to a user. The user interface further measures the time period an interrupt switch is open and reports data related the time period to a user. In the case where the electric source is a fuel-based generator, the source monitor measures fuel level in a fuel tank for the generator, and fuel data based on the fuel level is provided on the user interface. The user interface may also measure total electric power consumed by the power distribution system and fuel consumed for generating the power, and present a cost per energy unit for comparison with current or available utility rates.

The at least one load control may comprise a variable circuit breaker that adjusts dynamically to the transmitted load capability or an outlet adapter that closes an outlet to an appliance plug when load capability from the electric source is below a predetermined level.

Load capability may be determined based on a transmitted reference output signal intended to reduce power consumption during peak load or reduced power conditions.

BRIEF DESCRIPTION OF DRAWINGS

The foregoing and other objects, features and advantages of the invention will be apparent from the more particular description of preferred embodiments of the invention, as illustrated in the accompanying drawings in which like reference characters refer to the same parts throughout the different views. The drawings are not necessarily to scale, emphasis instead being placed upon illustrating the principles of the invention.

DETAILED DESCRIPTION OF PREFERRED EMBODIMENTS OF THE INVENTION

Figure 1:
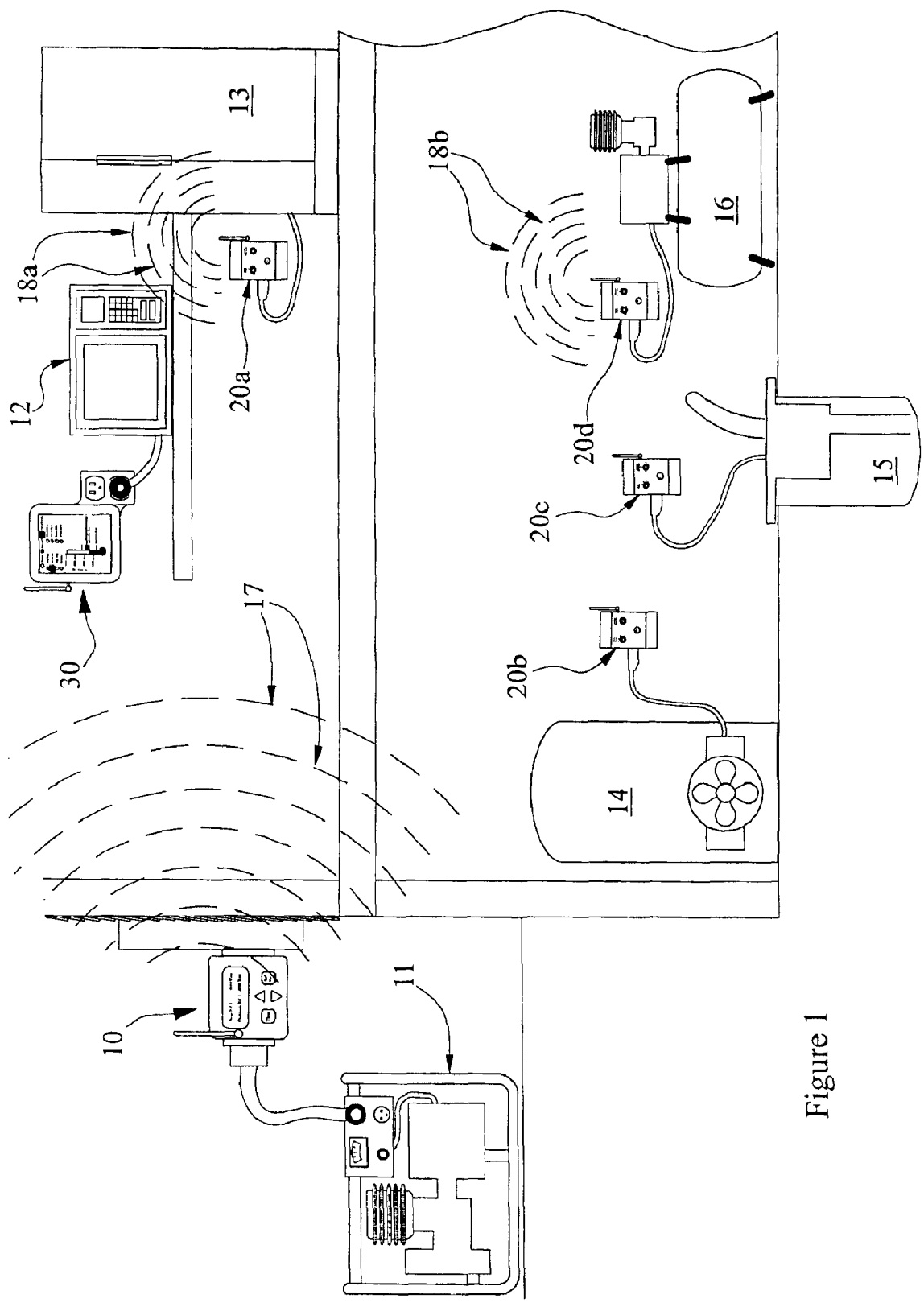
FIG. 1 is a schematic view of a typical installation of the present invention.

FIG. 1 presents a typical installation of the various components of the present invention. A generator monitor 10 is connected to a home's electric box where a generator's cable is plugged into the house. The Generator monitor 10 measures the current load, calculates available power and transmits data related to this power determination via transmission 17 to other devices distributed throughout the home. On the upper floor, an interrupt switch 20*a* is supporting a refrigerator 13, and in the basement, interrupt switches 20*b*, 20*c*, and 20*d* are supporting a blower motor for a furnace 14, a sump pump 15 and a water pump 16, respectively. The interrupt switches 20*a*, 20*b*, 20*c* and 20*d*, monitor transmissions 17 from the generator monitor 10 and either enable or disable their respective appliances based on their own internal decision making process. Interrupt switches 20*a*, 20*b*, 20*c* and 20*d* transmit their enabled or disabled status to other devices distributed throughout the home. Disabled status is being transmitted via 18*a* and 18*b* from interrupt switches 20*a* and 20*d* respectively. A user display 30 on the upper floor informs the user as to whether or not a microwave 12 can be operated on the existing available power at any given time. The user display 30 reports the "disabled" or "enabled" status of all the interrupt switches in the system based on transmissions monitored such as 18*a* and 18*b* from interrupt switches 20*a* and 20*b* respectively.

Generator Monitor

The generator monitor 10 reports the momentary available power, or latent capacity, of the generator or limited power source, to the other devices in the system. These power levels are referred to herein as Generator Available Power levels or GAP levels. The term GAP could also be thought of as the gap between the maximum capability of the generator and the momentary load on the generator. The GAP is the latent capacity of the generator that could be used to power additional appliances. In some instances, the GAP is the latent capacity relative to a reference capacity that is lower than the full rated capacity of the generator. In these circumstances the lower reference capacity is chosen for the purpose of enhancing the level of control the user has over the use of the generators capacity. The use and benefit of these GAP levels, calculated from lower reference capacities (referred to as "reference outputs") will be explained in detail below.

Figure 2:
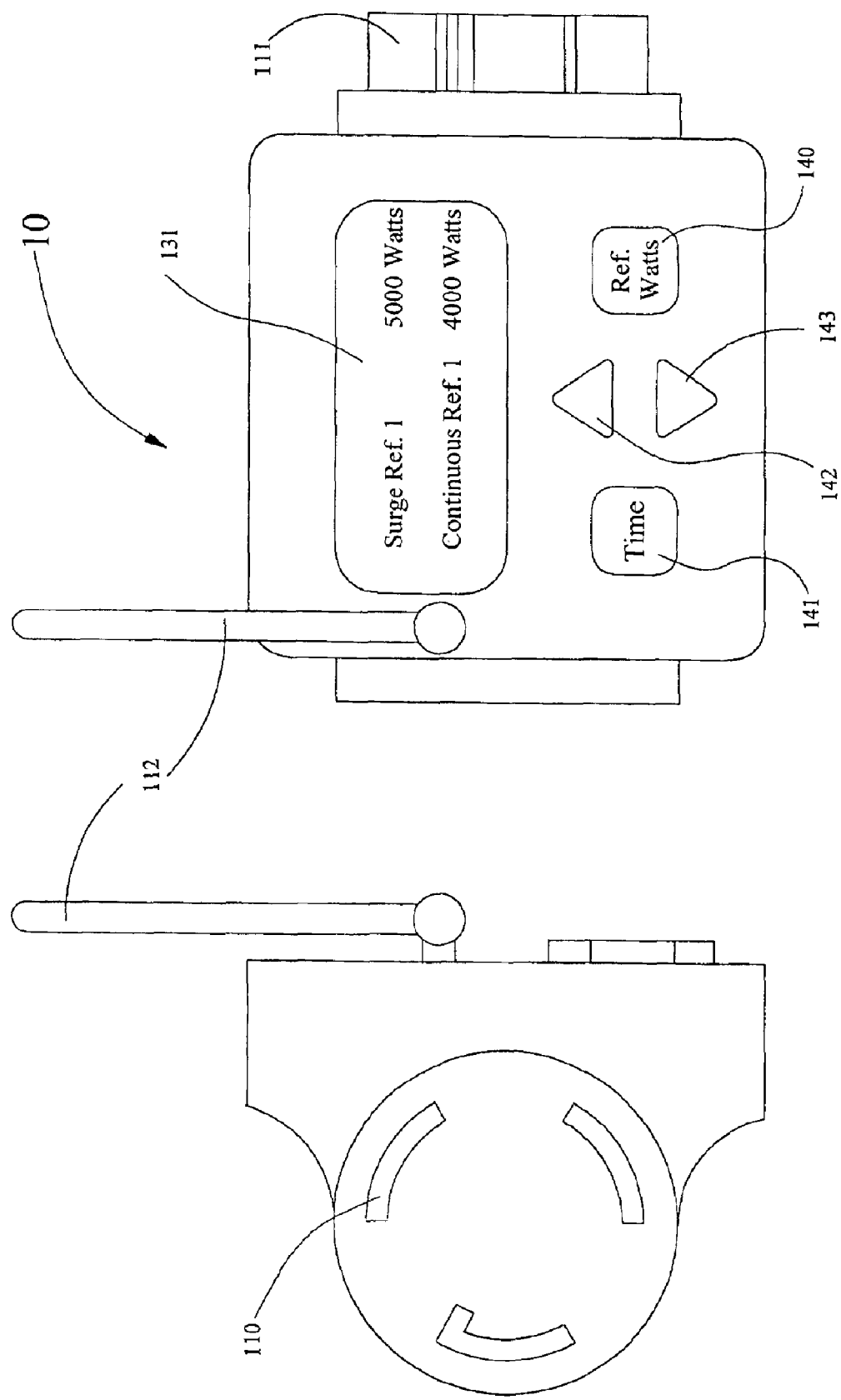
FIG. 2 is a block diagram of a generator monitor installed between the generator power cable and either the generator or the home's electric box, in accordance with the present invention.
Figure 3:
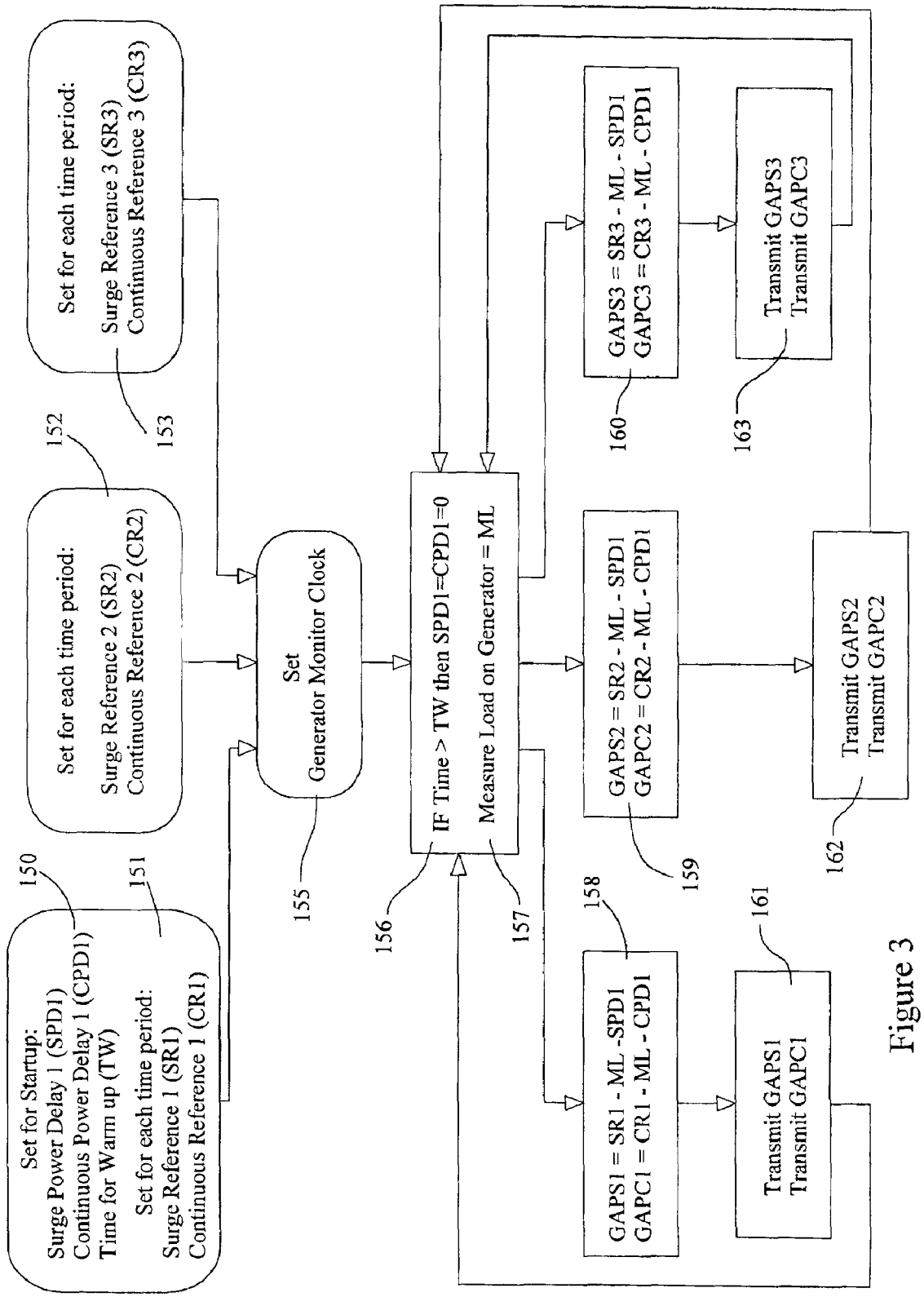
FIG. 3 is a flow diagram of the generator monitor's process, in accordance with the present invention.

It is well known that many appliances apply surge loads when first starting. The most common of these appliances are those with electric motors, which typically require two, three or even four times the power to start than is required to run continuously. To provide for this need, most generators are designed with surge and continuous load capabilities. The generators surge capability can last for just a few seconds in order to provide the power required by appliances with surge start up loads. The continuous load capability of the generator is the load level the generator can support on a continuous bases. To make full use of the generator's surge and continuous capabilities, the generator monitor 10 calculates and reports a GAP Surge (GAPS) and a GAP Continuous (GAPC) level. FIG. 2 shows a Generator monitor 10 and FIG. 3 provides a flow diagram of the generator monitor process. Alternative designs are possible with the removal or addition of certain features discussed below providing control over the device cost or device installation complexity.

With reference to the side and front views of FIG. 2, generator monitor 10, in accordance with one embodiment of the present invention, includes twist lock connectors, of socket 110 and plug 111, which is readily installable at the end of the generator cable used to connect the generator to the home circuit panel. In alternative embodiments, the generator monitor can interface with the electrical system at a plurality of locations, such as integrated into the home circuit panel, or built into the generator by the manufacturer where the generator monitor can measure the momentary power from the generator 11. The generator monitor 10 includes an antenna 112 for transmitting via radio waves, to the other devices in the system. Other methods of communication such as other wireless bandwidths, wire, and fiber optic, are equally applicable to the present invention. This generator monitor 10 in FIG. 2, includes a display screen 131 with input controls for setting reference outputs (Ref. Watts) 140 and the time of day 141. The generator monitor 10 further includes input controls for incrementing up 142 and decrementing 143 the values of reference loads, and the hours, minutes and seconds for setting time of day. The user can input multiple reference load levels for surge and continuous capabilities and control changes in these load levels based on time of day. The input controls permit the user to set the generator monitor's clock, which is used to control the changes in reference capacities.

FIG. 3 is a flow diagram of a process run in the generator monitor 10. Initially during step 150, a user inputs a Surge Power Delay value and Continuous Power Delay value. These values are used to delay the reporting of a full GAP capability when the generator or power source is first started, to allow the power source a time frame in which to warm up. It is well known that many combustion engine manufacturers recommend that the engine be allowed to run for a brief period of time, ranging from a few seconds to a few minutes before operating the engine at full power. This time period is often intended to allow the engine to establish oil pressure and establish reasonable operating temperatures in some or all of its engine parts. In the case of fuel cells, an initial warm up period is required to bring the cells up to an efficient operating temperature where output voltage and amperage stabilize at or near design intent. Independent of the technical reasons for delaying the load applied to the power source, the use of the surge and continuous power delay factors can be used to accommodate this delay. The levels of power reduction from full rated capacity are defined by SPD1 and CPD1 in step 150 of FIG. 3. The value of TW or Time to Warm up, is also set in 150. These delay values are subtracted from the calculated GAP levels until the time since generator start or "Time" in 156 is greater than TW, at which point SPD1 and CPD1 are set to zero and do not further effect the GAP levels calculated.

The embodiment of the invention can prioritize the power from the generator by setting varying levels of reference outputs. GAP levels are be calculated from reference outputs set at levels equal to or less than the generator's rated surge and continuous capacities. Lower priority appliances are controlled by GAP levels calculated from reference outputs that are lower than the rated capacity of the generator. Lower reference outputs, cause lower calculated GAP levels and the devices of the invention monitoring these lower GAP levels have lower priority access to the generator's power. Surge reference outputs are referred to as SR and continuous reference outputs are referred to as CR. Gradually lower levels of surge and continuous reference outputs are identified with trailing numbers SR1, CR1, SR2, CR2, SR3, CR3, etc., Three levels of surge reference and continuous reference 151, 152, 153 are determined and set. Alternative generator monitor embodiments may include more or less than three sets of surge reference output and continuous reference output levels. A user can also set the generator monitor clock 155 that governs changes in the reference outputs with time of day. With higher power generators, a homeowner will find that there is some flexibility in the allocation of the generator's capacity. For this purpose, the generator monitor 10 can use multiple reference outputs for calculating multiple surge and continuous GAP levels. The user can then set the other devices in the system to execute their decision process relative to one of the GAPS and GAPC levels transmitted from the generator monitor 10. The setting of different reference outputs allows the user to assign priority levels to appliances. This priority setting will be explained in more detail below, in connection with the descriptions of the other devices in the system and with implementation examples at the end of the detailed description. It is important to note that the setting of reference outputs need only be done once at installation. If the generator monitor is equipped with battery power, for powering the clock, the setting of the clock need only be done once at installation. Other than the potential need to set the clock, the presence of the generator monitor 10 does not introduce any additional management tasks when utility power fails and the generator is brought on line.

As shown in FIG. 3, the generator monitor measures the momentary load (ML) on the generator 157. The data values for ML and SPD1 (or CPD1), ML and SPD2 (or CPD2) and ML and SPD3 (or CPD3) are then subtracted from the surge reference output and continuous reference output levels previously set by the user, at steps 158, 159 and 160 respectively. The differences represent the generator's latent capacities or Generator Available Power levels for the given reference outputs. The invention now calculates three sets of GAP levels (GAPS1, GAPC1, GAPS2, GAPC2, GAPS3, GAPC3, etc.) which are Generator Available Power levels for three levels of reference outputs or priorities for three different groups of appliances. The three sets of GAP levels are transmitted via transmission 17 (see FIG. 1) to the other devices in the system, at steps 161, 162 and 163. Note that the values of SPD1 and CPD1 are greater than zero step 156 for a short period of time as noted above, in order to lower the GAP levels initially following startup of the power source. This serves to lower the total load applied to the power source during initialization and warm up. The generator monitor process flow of FIG. 3 goes on to repeat the measuring and transmitting of GAP levels at an interval similar to the response time of the system. The response time may be on the order of the time it takes for the generator monitor 10 to measure the momentary load, calculate GAP levels, transmit GAP levels, receipt of GAP levels by other devices in the system, initiate their decision processes and for appliances to apply their load after having power returned. This response time can be assumed to be somewhere between a fraction of a second and a few seconds. The GAP power levels may be transmitted by transmissions to receivers in the system via any of a number of networking protocols and communication media.

For facilities being powered by renewable energy sources, the total system power varies with the amount of electricity stored in batteries and the electricity being generated by solar panels, wind powered generators, hydro generators, etc. Given that such systems contain multiple components for generating and storing energy, and each of these components has its own performance and efficiency characteristics, the optimum level of electric output for a given system can vary with certain factors such as the state of charge in the storage system, the intensity, angle and/or strength of the suns rays striking the solar panels, the speed and/or force of the wind driving the wind powered generators, the height of the water column driving the hydroelectric generators, etc. If the renewable energy system is designed to determine its own optimum power output for a given operating condition, this power output can be communicated to the generator monitor 10. This optimum power output could be used to calculate the various reference outputs used by the generator monitor, such that the generator monitor 10 tracks the dynamic capability of a power source rather than using set reference outputs determined from the fixed generating capacity of a combustion engine powered generator. This allows the user to optimize the reference outputs and associated GAP levels to the power source's most efficient operating level.

In some instances, electrical loads are programmed to operate at scheduled times during the day. For example, an electric hot water heater can be placed on a timer that activates the water heater during specified intervals. The intent is to heat water during off peak periods for the purpose of reducing peak loads on the electric utility. Timed loads can be managed by the invention by adjusting reference outputs on the generator monitor 10 by time of day. As mentioned previously, the invention uses other devices that control the use of appliances in the facility. The function of these other devices will be explained in detail later. Briefly however, a device referred to as and "interrupt switch" will interrupt the power to an appliance whenever the load of the appliance is larger than the GAP or latent generating capacity. By interrupting power to the appliance, the appliance cannot activate when its electric load level can overload the generator and trip the circuit breaker. However, for a timed load such as the hot water heater, its predictability allows for the load to be managed solely by the generator monitor 10 and avoid the need for an interrupt switch. Programming the generator monitor 10 to lower some, or all of the reference outputs by the amount of the load, for the time and duration of the load, accommodates the timed load. Lowering the reference outputs reserves the power required by the timed load and prevents the other devices and appliances in the facility from detecting and using this reserved power. Lowered reference outputs cause the calculation of GAP levels to be lower and in turn the transmitted GAP levels in transmissions 17 of FIG. 1 report lower Generator Available Power, GAP, to the other devices in the system. The lower GAP levels prevent the other devices from accessing the power being used, or about to be used, by the timed load. The actual timing of the reduction in reference outputs is dependent on the nature of the load cycle executed by the timed load. If the load is a constant load for a set time, the generator monitor 10 need only lower the reference outputs by the amount of the load for a few minutes prior to the starting of the timed load. The reference outputs are programmed to return to the original settings 5 to 10 minutes after the timed start of the timed load. If the load cycle changes during the timed load, then the reduction in reference outputs is lowered for the duration of the timed load. The need for the two processes for lowering reference outputs is clarified further with the explanation of the other devices in the system and how their processes react to each other.

In an alternate embodiment of the invention, the generator monitor 10 can execute on request, a power reduction that reduces the reference outputs for an identified period of time. This feature allows for an appliance that has varying loads during an operating cycle. An example of such an appliance is a washing machine, which draws higher power levels during wash and spin cycles, and lower power levels when filling and draining water into and out of the machine. The request to the generator monitor 10 could come from any of the other devices, either a user display 30 or an interrupt switch 20, allowing the user to request a lowering of the reference outputs by the maximum load of the appliance, for a time period similar to or slightly longer than the cycle time of the appliance. By reducing the reference outputs from which GAP levels are calculated, this feature reserves the maximum load of the cycling appliance for the duration of the cycle by removing the power needed for the load, from the GAP reported to the other appliances.

Figure 1A:
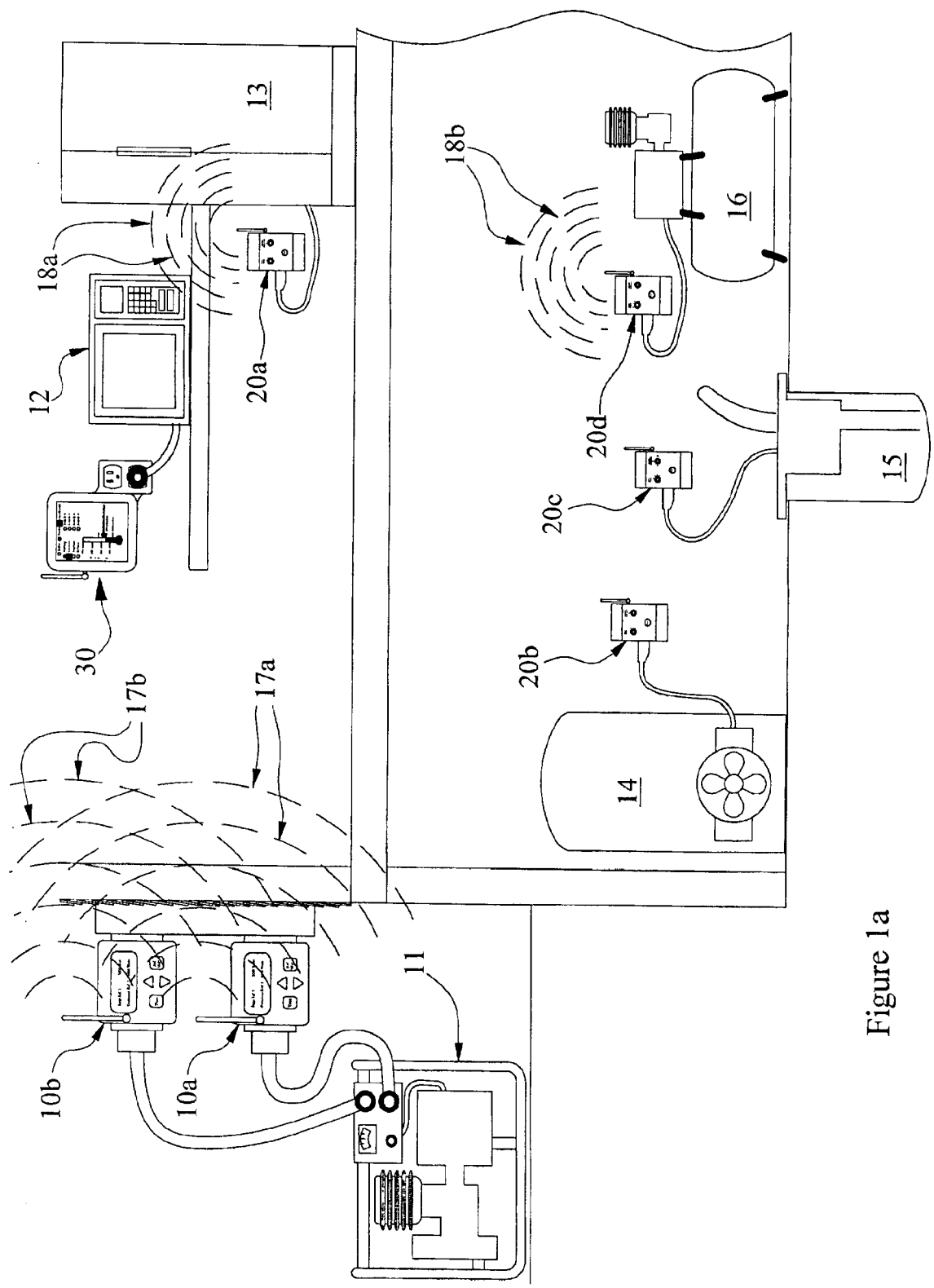
FIG. 1a is a schematic view of a typical installation of the present invention with two power lines from the generator to the transfer box on the home, and a generator monitor on each power line.

The system of the present invention can support an additional level of power management by using two or more generator monitors 10*a*, 10*b* in FIG. 1*a*, between the power source and the electrical loads in the home or facility. With one generator monitor 10, in the system FIG. 1, power management is based on one measured load applied by the home. With two or more generator monitors 10*a* and 10*b*, in FIG. 1*a*, measuring the loads of selected circuits in the home, the invention offers one more variable for increased control over the use of the generator's capacity.

In this embodiment, each generator monitor calculates independent GAP levels as described previously. Each generator monitor 10*a*, 10*b*, etc. could have multiple reference outputs, provided the sum of the highest reference outputs, set on each of the generator monitors, did not total more than the total capacity of the generator or power source.

An example of this is a home with a large generator capable of 7000 Watts surge and 6000 Watts continuous, supporting a large number of appliances that turn themselves on and off via their own internal control systems. Assume that the generator does not have an automatic starting system and must be started by the homeowner whenever there is a power failure. Also, assume the user does not notice a power failure for several hours, due to the power failure occurring when the user is asleep or away from the home. Upon returning, the user finds the home without power and proceeds to start the generator. Assume the home has a refrigerator, a freezer, well water pump, sump pump and furnace, that will all turn on once power is returned. Such appliances that turn themselves on and off will be referred to as "automatic appliances". Assume the homeowner wants to reserve 4000 watts for loads such as lights, stove, toaster, hair dryer, etc. However, after a prolonged power outage, the owner wants to allocate more power to the automatic appliances for the first half hour once power is returned, to allow these appliances to recover from the outage. The home and generator could be equipped with two outlets for connecting power cables. The transfer box on the home can have the automatic appliances wired to one of these outlets, while the second outlet supports all the other appliances in the home.

In this illustrative example, to provide priority to the automatic appliances when power is first supplied by the generator, the first generator monitor 10*a*, connected to the outlet supporting the automatic appliances is set to use a reference Output of 6000 Watts surge and 5000 Watts continuous for the first 30 minutes after generator power starts. The second generator monitor 10*b*, supporting the remaining appliances is set with reference outputs of 1000 Watts surge and 1000 Watts continuous for the first 40 minutes after generator power starts. After the first 30 minutes, the first generator monitor 10*a*, supporting the automatic appliances reduces the reference outputs to 3000 Watts surge and 2000 Watts continuous. After the first 40 minutes the second generator monitor 10*b*, supporting the other appliances in the home increases the reference outputs to 4000 Watts surge and 4000 Watts continuous. The 10 minute difference in these changes (first generator monitor 10*a* changing after 30 minutes and the second generator monitor 10*b*, changing after 40 minutes) is for the purpose of allowing the other devices to respond to the changes in a way that does not signal more available capacity from the generator than actually exists. By executing this sequence, the system provides more power to the automatic appliances in the first 30 minutes after generator power starts. Thereafter, the generator power provided to the automatic appliances is reduced to a level that supports one or two automatic appliances simultaneously, and a larger portion of the generator power is provided to the remaining appliances in the home or facility.

With multiple generator monitors 10*a*, 10*b*, etc, the user can allocate a specific portion of the generator's power to a group of appliances supported by the generator monitor. A properly configured system can allocate enough power to the automatic appliances but force them to operate in sequence. In turn the system reserves the majority of the generator's power for the appliances that provide the other conveniences to the homeowner. The actual reference outputs and time frames may vary based on preferences, generator capacity and appliance loads. However, by using multiple generator monitors 10*a*, 10*b*, . . . that support groups of separately wired appliances, the system of the present invention provides an additional method for managing the use of electricity from the generator.

Generator monitor 10 could also be connected to fuel level indicators in the generator fuel tank. Using intelligence related to the quantity of fuel remaining in the tank and generator consumption information, either input manually based on performance specifications, or calculated from past monitored fuel consumption, the generator monitor calculates and transmits a prediction of the time remaining before the tank is empty at the current load level, at full load or at any desired partial load level. This time to empty information is displayed by other devices in the system for monitoring by the users. In addition, the generator monitor 10 could measure the total kilowatt-hours transmitted to the home and report feed back data such as the Kilowatt-hour per quantity of fuel consumed by the generator. Such feed back data should compensate for the generator's range of efficiency and for the fuel used when at idle due to minimal or no power being drawn by the home. This calculation combined with the price of the fuel, could be used to compare the cost of electricity from the generator with the cost of higher, or spiking, utility rates. During times of high demand and/or high electric rates, this information allows the user to make an economic decision regarding the use of utility power vs. an alternate power source, independent of a power outage.

For simpler implementations of the embodiment of the invention, generator monitors 10 could be designed without display screens and with fewer settings. An inexpensive, and low function, generator monitor could be configured to calculate one set of GAP levels with no reference to time of day. In this circumstance the generator monitor need only have two settings, one for the reference surge and one for the reference continuous. In most cases reference outputs on a simple generator monitor 10 would be set for the rated capacities of the generator. This scenario will again be clearer with examples that incorporate the other devices of the invention. For the moment, this simple design of the generator monitor 10 describes the minimum functionality. A number of generator monitor embodiments could be configured with various combinations of features described above.

Interrupt Switch

The purpose of an interrupt switch 20 is to disable an appliance by cutting off or interrupting power to the appliance whenever the assigned GAP levels fall below the appliance's start up load and continuous load. By interrupting power to the appliance, the interrupt switch 20 creates a local power failure for the supported appliance, and maintains this power interruption until the GAP levels rise to a point where the appliance load can be supported. By interrupting power to the appliance, the interrupt switch 20 assures that the appliance cannot start and apply a load that would trip the generator's circuit breaker. Once the transmitted GAP levels reach a level that supports the appliance load, the interrupt switch 20 enables the appliance by closing its switch, returning power to the appliance and allowing it to run, if required. The interrupt switch 20 executes a local decision process that makes power available to the appliance only when the generator is able to support the load of the appliance.

Figure 4:
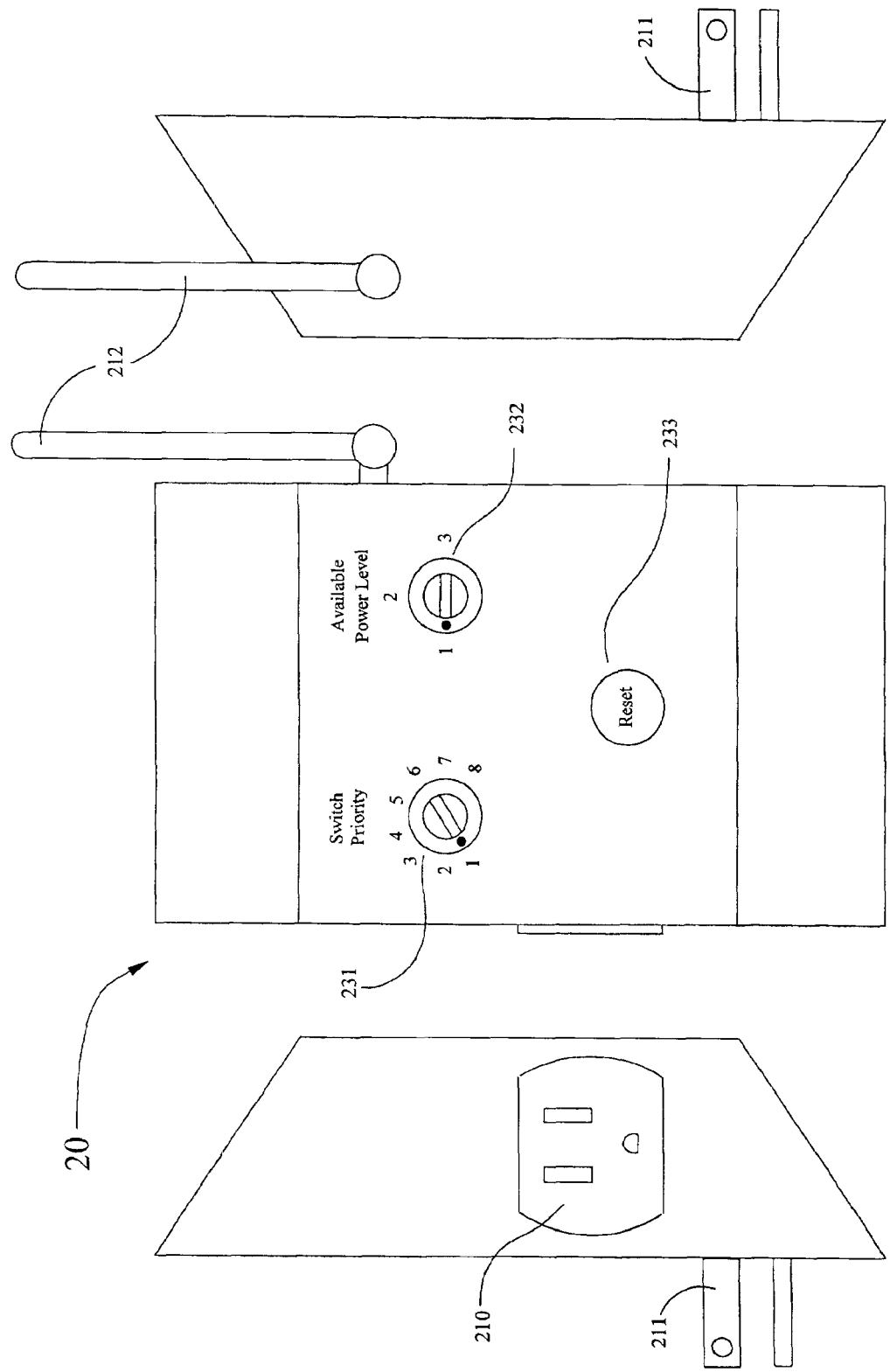
FIG. 4 is a block diagram of an interrupt switch with settings for its priority and the available power level it should monitor, in accordance with the present invention.

FIG. 4 is a right side, front side, and left side view of an embodiment of the interrupt switch 20. The interrupt switch 20 includes a first dial 231 for priority setting, a second dial 232 for assigning the GAP level that the interrupt switch monitors (i.e. GAPS1 and GAPC1, GAPS2 and GAPC2, GAP3 and GAPC3 of FIG. 3), a reset button 233 and an antenna 212 for receiving GAP level transmissions from the generator monitor 10, 10a, or 10b, and for transmitting switch status to the user displays 30 (see 18a and 18b in FIG. 1, 1a) in the system.

The priority set with dial 231 in FIG. 4, is a unique priority assigned to each interrupt switch 20 in the system. The priorities are used by decision processes of the system of the present invention's to sequence the return of power to the appliances supported by interrupt switches 20. The interrupt switch's 20 decision processes multiply the assigned priority times various time intervals, to determine the time in the sequence at which power should be returned to the supported appliance. The use of priorities and time intervals are explained in more detail in the descriptions of each interrupt switch process. However, as an introduction to the use of the unique priorities, the intent is to sequence the return of power to appliances supported by interrupt switches. The sequencing of appliance loads avoids overloads that can be caused by the simultaneous return of power to multiple appliances. As loads are added to the generator sequentially, the devices in the system of the present invention have time to monitor changing GAP levels and respond according to their own decision processes.

The GAP level dial 232 allows the user to set which GAP level transmission 17 from the generator monitor 10 the interrupt switch 20 monitors. The user can assign appliances to GAPS1 and GAPC1, GAPS2 and GAPC2 or GAPS3 and GAPC3 by setting Available Power Level dials on the supporting interrupt switches to 1, 2 or 3 respectively.

Figure 5A:
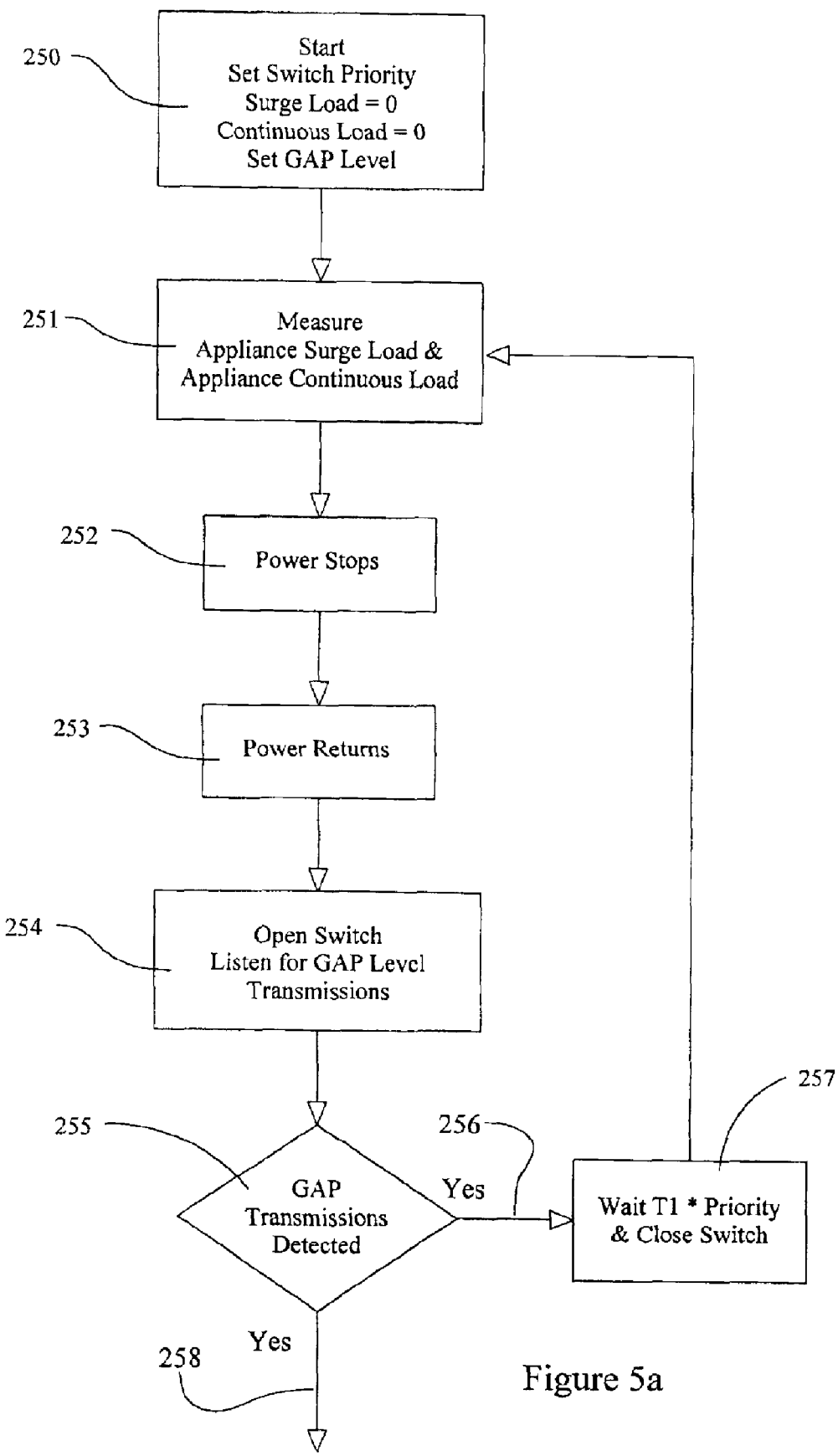
FIG. 5a is a flow diagram for the set up and first decision process executed by the interrupt switch where the switch determines whether the returning power is from the electric utility or from the backup generator, in accordance with the present invention.

The reset button 233 is used to clear, or set to zero, the values of appliance surge load and continuous load, FIG. 5a step 250, whenever an appliance is first supported by the interrupt switch 20. The interrupt switch 20 measures the surge and continuous loads of the appliance over time in step 251, stores the values of these loads and then uses the load values in the execution of the interrupt switch 20 decision process in FIG. 5b. The purpose of the reset button is to zero the stored load values when an interrupt switch is first installed, or when an appliance is changed (i.e. a refrigerator wears out and is replaced with a new refrigerator that has different surge and continuous load characteristics). For interrupt switches that were set with surge and continuous loads manually, or for switches built into the appliance by the manufacturer, the reset button would not be necessary. For interrupt switches designed to be set manually with the surge and continuous load of the supported appliance, dials for setting these loads would be substituted for the reset button.

FIG. 4 depicts an interrupt switch 20 that interfaces in the power line to the appliance by plugging into a standard three-prong outlet via plug 211 and then providing a similar outlet 210 for the appliance. The present invention is equally applicable to configurations with alternative outlet designs and configurations where the interrupt switch is installed in the power line of an appliance that is hardwired to a facility's circuit panel.

Figure 5B:
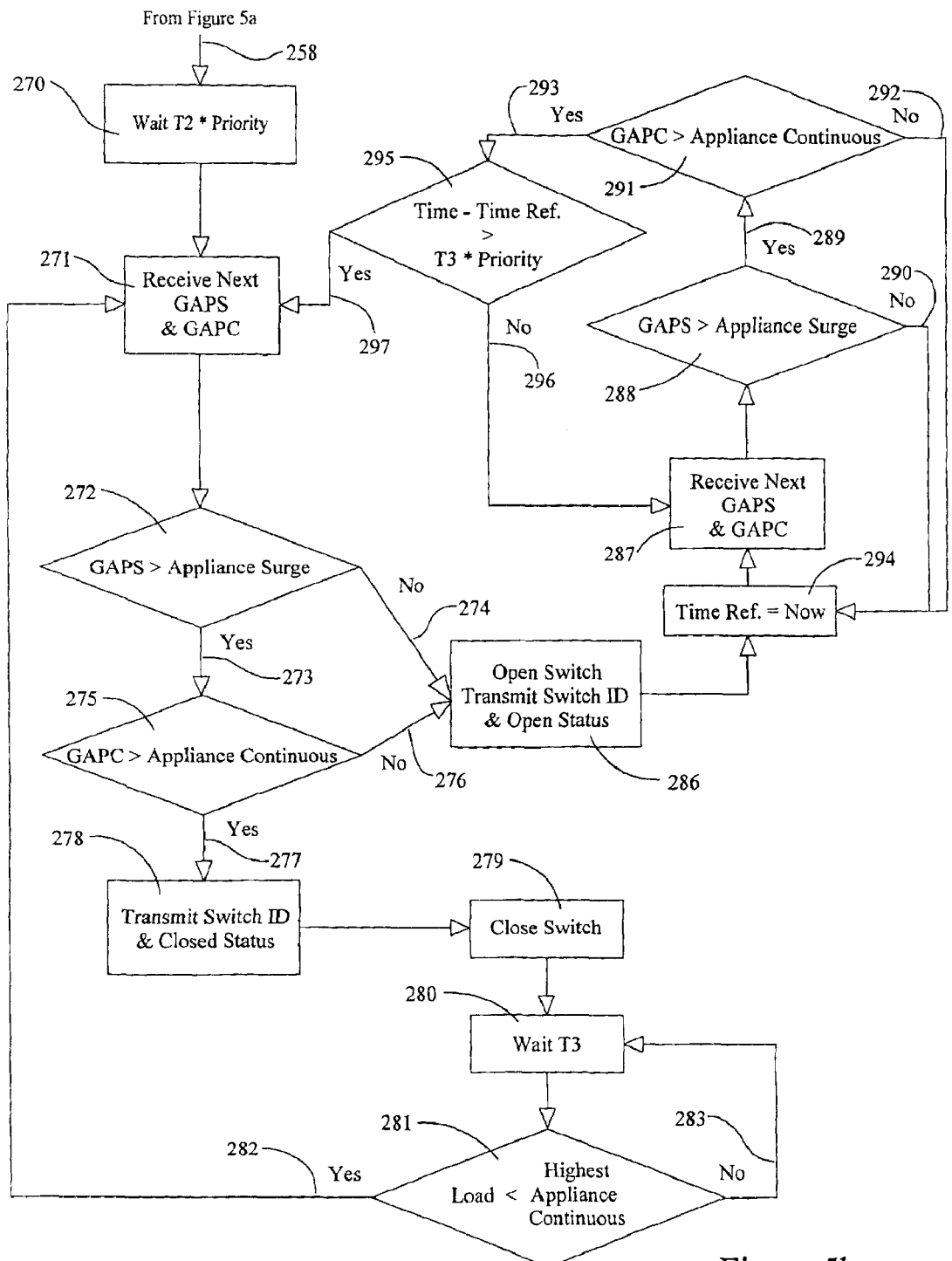
FIG. 5b is a continuation of the flow diagram of 5a showing the interrupt switch process for the case where the returning power is from the backup generator, in accordance with the present invention.

FIGS. 5a and 5b are flow diagrams of the process of interrupt switch 20. In FIG. 5a the switch priority and the GAP level are set at installation in step 250 using dials 231 and 232 in FIG. 4 respectively. If the surge load and continuous load are to be set manually (not shown) they are set along with the Switch Priority and GAP level. If the Switch is designed to measure and record the appliance load, then these values are set to zero in step 250 by the reset button 233 in FIG. 4. The interrupt switch 20 is then plugged into the wall outlet and the appliance is plugged into the interrupt switch. With this installation being done prior to a utility power failure, the interrupt switch 20 has several opportunities to measure and establish the typical or maximum surge and continuous load 251 of the appliance. With these load characteristics measured and stored, the switch is ready for the first power failure.

When the power fails 252 and then returns 253, the interrupt switch 20 opens its switch in step 254 and interrupts the supply of power to disable the appliance. At step 255 the interrupt switch 20 executes a decision process to determine if the power returning to the outlet is from the electric utility or from the generator. The decision process in step 255 is based on the presence or absence of Generator Available Power (GAP) transmissions coming from the generator monitor 10 in FIG. 1. If GAP transmissions are not detected in step 255, then utility power has returned and the interrupt switch 20 may close immediately and return power to the appliance. However, there is an opportunity to provide benefit to the utility grid by delaying the return of power after decision process 255 leads to path 256, by executing an additional time delay via the process in step 257.

It is well known that when utility power is returned, the sudden start up load of all the appliances left on during the outage puts a heavy strain on the utility grid, potentially causing damage to the equipment in the grid. In order to lessen this start up load, the interrupt switch 20 executes a delaying time sequence that causes the load of its appliance to be applied several seconds, or potentially a few minutes, after the utility power is returned. This reduces the total start up load when power returns and reduces the chances of damage to the utility grid. In this flow diagram the delay sequence 257 is simply the assigned priority of the interrupt switch 20 multiplied by a wait constant T1. Given there are numerous known timing sequences; there are many processes for executing a gradual return of appliance loads to the utility grid. A unique aspect of the present invention is the use of the appliance disabling capabilities of interrupt switch 20 for this second purpose of delaying the appliance load when utility power returns.

In the case of a utility power failure where the generator provides power to the system, the interrupt switch 20 detects the transmission of the GAP levels in step 255 and executes a decision process along path 258 and the control proceeds according to the process flow diagram of FIG. 5b.

With reference to FIG. 5b, the "Wait T2* priority" function 270 provides a delay that allows the generator a time period in which to warm up before the appliance is provided power and allowed to turn itself on if necessary. Depending on the design, both engines, or fuel cells, require anywhere from a few seconds to a few minutes to warm up before full load can be applied without inflicting excessive wear and tear. The value of T2 is set to allow the gradual return of appliance loads to the electrical system currently being supported by the backup power source. Assume a combustion engine powered generator requires 15 seconds to fully establish oil pressure at which point the manufacturer recommends no more than half the total load be applied for minimal wear and tear on the engine. The manufacturer further recommends full power be delayed for a total after 45 seconds after cold start allowing certain engine parts to achieve a higher or near full operating temperature. For this set of engine requirements, T2 is set to 15 seconds causing the first appliance, with its interrupt switch 20 set to priority one, to wait 15 seconds before having power returned, the second priority appliance, with its interrupt switch 20 set to priority two, waiting 30 seconds and the third priority appliance, with its interrupt switch 20 set to priority three, waiting 45 seconds, etc. In this scenario, the load of the first appliance in addition to any manual appliances or lights left on in the facility, is assumed to be less than half the full load capacity of the generator. The addition of the second priority appliance at the 30 second mark, is considered appropriate for the engines capacity at the time since engine start. The addition of the third priority load with all those allowed prior, occurs at the 45 second mark when the engine manufacturer recommends full load can be applied. Alternative equations for step 270 are equally applicable to the principle of the present invention, for example, a wait period of:

$$T\emptyset + (T2 * Priority),$$

Where the wait period TØ is perhaps the full 45 seconds the engine manufacturer recommends before applying full load. This would be useful if the electric load of the lights, clocks and other appliances, not on interrupt switches, are equivalent to, or near, the half total load recommended after 15 seconds. Following the 45 second period of TØ, the value of T2 may be on the order of 1 or 2 seconds allowing the appliances coupled through interrupt switches 20 to be activated much more quickly, once the generator is warmed up to the point where it is capable of supporting its full rated capacity.

In the case of a fuel cell generator, the warm up time can be much longer than that of a generator powered by a combustion engine. A fuel cell generator can take several minutes to warm up to the point where it can produce its full rated power. In this case a process for step 270 can create a longer and more gradual set of delays for the different priority appliances on interrupt switches, commensurate with the fuel cell generator's capability during the initial start up phase.

After appliance loads have been delayed sufficiently to allow the generator to warm up, the interrupt switch's 20 control system moves on to step 271 where the GAP levels are received from the generator monitor 10. The interrupt switch 20 evaluates the GAP levels by comparing them to the observed surge load and continuous load of the connected appliance in steps 272 and 275. If either the surge load or continuous load of the appliance are greater than the GAP levels received, then the control system moves along either path 274 or 276 to process step 286. At step 286 the interrupt switch 20 keeps the power switch open, depriving the appliance of power, and the interrupt switch 20 transmits as in 18a or 18b of FIG. 1, either its unique interrupt switch ID or its assigned Switch Priority 231 in FIG. 4, along with its "Switch Open" status. The "Switch Open" status may, for example, be received by a user display, for additional reporting that is explained below in the detailed user display section. The control system then proceeds to step 294 to set the time reference to now, or to zero. The time reference is used to measure the wait period based on the interrupt switch 20 priority, during which the GAP levels must remain sufficient in order for the decision process to return power to the appliance. The control system proceeds to step 287 to receive the next GAP level transmissions from the generator monitor 10. These GAP levels are checked in step 288 and 291 to determine whether the observed surge and continuous loads of the appliance are less than the GAP levels received. If the GAP levels are less than the appliance surge load and continuous load, the control system proceeds along path 290 or step 292 and returns to step 294 to reset the time reference to now or zero, and then proceeds to 287 to repeat the previous GAP level check. When the GAP levels are both higher than the surge and continuous loads of the appliance, then the control system passes through step 288, along path 289, to step 291 and along path 293 on to step 295 where the current time minus the time reference is compared to the time value of T3 times the interrupt switch 20 priority. This process step 295 determines whether or not the interrupt switch 20 has waited its unique wait period, which is equivalent to the time interval T3 times the switch priority. The time interval T3 is on the order of, or a little longer than, the response time of the system as listed in the description of the generator monitor 10. If this time period for which the GAP levels have been sufficient to support the appliance is not greater than the unique wait period dictated by the interrupt switch 20 priority, the control process returns via path 296 back to step 287 to receive the next GAP level transmissions. Note that process block 294 is bypassed and the time reference is not reset. The GAP levels go through the same check process via step 288 and step 291 again. If an appliance on a higher priority interrupt switch 20 has been enabled and the appliance activates, applying its load to the generator, then the momentary load (ML) measured by the generator monitor 10 increases and the transmitted GAP levels decrease. The decreased GAP levels may not be high enough for the control system of this switch to pass the tests in steps 288 and 291. If this occurs, the control system returns via path 290 or 292 and then to step 294 to reset the time reference to now or zero and begin the process again. However, if the GAP levels remain high enough to support the observed surge and continuous loads for the appliance, then the control system proceeds again through path 288, 289, 291, 293 to 295 to determine whether the time that has passed since the time reference, is greater than the wait time "T3* Priority". If this wait time is greater than T3* Priority, then the control process continues via path 297 to step 271 to check the GAP levels one more time and if still sufficient, goes through steps 272, 273, 275 and 277 to 278 where the Switch ID or Switch Priority Number is transmitted with a "Switch Closed" status followed by the control process going to step 279 where the switch is closed and power is provided to the appliance.

Once power is returned to the appliance, the system maintains power to the appliance as long as it is running and applying an electric load. This process follows the path of step 280, step 281, path 283 and back to step 280. The wait period of T3 in 280 is on the order of the response time of the system, and is intended to allow an automatic appliance the time necessary to recognize when it has power and then to activate and apply a load if needed.

The logic behind the condition of maintaining power to a running appliance is that the appliance load is either on or off and when it is on, it cannot turn on again and apply its electric load a second time. The system of the embodiment of the invention accounts for the load of an operating appliance in the generator monitor's 10 measurement of momentary load (ML). The system therefore does not interrupt power to an operating appliance that is applying its highest continuous load, as the appliance load cannot increase and incur the risk of overloading the generator and tripping the circuit breaker.

Only the appliances that are not activated, or operating at a partial continuous power level, pose the risk of activating or increasing their load and tripping the circuit breaker.

Once the interrupt switch 20 has closed at step 279 in FIG. 5b, power to the appliance is enabled, and the wait period in step 280 is completed, the process step 281 determines whether the supported appliance is operating and applying its highest continuous load. If process step 281 determines there is no load, or the continuous load is less than the highest continuous load for the appliance, the control system follows path 282 to step 271, to again check the GAP levels being transmitted by the generator monitor 10. When the appliance is not at its highest continuous load there is the potential of the appliance activating a higher operational state and increasing its load. To avoid this potential increase at a time when the increase can overload the generator and trip the circuit breaker, the process checks the transmitting GAP levels starting with step 271. If one of the GAP level checks fail in either steps 272 or 275, the control system follows path 274 or 276 to step 286 where the interrupt switch opens, disabling power to the appliance, at which point the monitoring and waiting process repeats as explained above starting with step 294. The monitoring process starting with step 294 is the same as explained above. Alternately, when following path 282 to step 271 if the control system finds sufficient GAP levels in steps 272 and 275 then the process continues to 278 and 279 to keep the switch closed and the appliance enabled. If the supported appliance activates and draws its highest continuous load, the switch remains closed per the process in step 281 along path 283 back to step 280. If the appliance does not activate and apply the highest continuous load, then step 281 directs the process again along path 282 to the GAP level monitoring process starting at step 271.

Collectively, the interrupt switches 20a, 20b, 20c, 20d, . . . work together in a system of artificial intelligence. During the calculated wait period, each interrupt switch 20 monitors the GAP level transmissions generated by the generator monitor 10, while continuing to hold its switch open and power interrupted in steps 287, 288, 291, 293, 295, 296 and back to 287. If the GAP level falls below the requirements during the wait period of step 287, step 288 to path 290 or to path 289 to step 291 to path 292 back to step 294 the time reference is reset to zero and the interrupt switch 20 starts timing again while continuing to hold the switch open and the appliance disabled. If the GAP level remains below the load applied by the supported appliance, the time reference keeps getting reset to zero and consequently does not increase beyond the time for one cycle. Once the GAP level rises to a point above the requirements of the appliance, the interrupt switch 20 follows path 293 through which the time reference is not reset to zero. Along this path, the time reference increases and becomes a factor in the decision process in step 295. If the GAP level remains larger than the appliance load during, and at the end of, the wait period, then the switch is closed and power is returned to the appliance according to path 297, 271, 272, 273, 275, 277, 278 and 279. If the first, or high, priority appliances turn on and apply their loads when their interrupt switches return power, the GAP levels are reduced accordingly by generator monitor 10, causing lower priority interrupt switches (with larger priority numbers and longer calculated wait periods) to detect lower GAP levels and continue to hold their switches open and their appliances disbled. With every increase in GAP level that passes through the load requirements of an appliance, the interrupt switch 20 or switches 20, reset new wait periods. Given the wait periods are different for all interrupt switches in a system, no two interrupt switches can return power to their appliance at the same time. With each interrupt switch 20 executing its own decision process, the system comprised of the interrupt switches allocates the power from the generator in an orderly fashion without overloading and tripping the generator circuit breaker.

An optional feature is shown in FIG. 5b of the interrupt switch 20 Flow diagram. In some implementations, users may want to be notified if appliances have been without power for an extended period of time. For this purpose, the interrupt switch 20 is equipped with the ability to transmit its status to another device in the system, for example the user display 30, of either open switch in step 286 or closed switch in step 278. The interrupt switch 20 transmits either a unique identifier, or its assigned priority, along with its open or closed status. In the case of interrupt switches transmitting via radio waves, the switch can avoid potential Electro Magnetic Interference (EMI) caused by its appliance, by always transmitting when its switch is open. As the flow diagram shows, the switch transmits an open status in step 286, just after opening the switch, and transmits a closed status in step 278, just before closing the switch. In this scenario, the appliance coupled to the interrupt switch 20 does not have power with which to generate EMI when the interrupt switch 20 is transmitting.

As noted in FIG. 5b via path 280, 281, 283, back to 280, the interrupt switch 20 maintains power to an appliance if it is running, and only disables, or interrupts power, if the appliance is not running under path 282, 271, 272, etc. of FIG. 5b. Given the load of a running appliance is accounted for in the measurement of the momentary load, ML, in step 157 of FIG. 3, there is no need to interrupt a load that is accounted for and cannot increase. The exception to this assumption is an appliance that has more than one level of continuous load. Examples of such appliances are refrigerators and air conditioners. Refrigerators draw a low continuous load to power the temperature monitoring system and the internal light when the refrigerator door is opened. The refrigerator draws a much higher continuous load when the compressor motor is running. In the case of an air conditioner, the continuous load is relatively low when just the ventilation fan is running and much higher when the compressor is running. The interrupt switch 20 is therefore designed to recognize the highest continuous load and use this value in its decision making process 281 and in determining if the appliances current state is interruptible. If the continuous load currently applied is the highest of the continuous loads, the interrupt switch 20 does not disable, or interrupt power, if the assigned GAP levels fall to a point where the generator can not support a load equal to that of the appliance. If the current continuous load is lower than the highest measured continuous load, then the interrupt switch 20 interrupts power whenever the GAP levels fall below the start up and continuous load of the appliance. This causes an interrupt switch 20 to interrupt power to a refrigerator drawing just the load of the door open light, should the GAP level fall below the refrigerator start up or continuous load. Also, the air conditioner running just its ventilation fan can be interrupted should the GAP levels fall below the combined fan and compressor surge or continuous loads.

The present invention also provides for an interrupt switch that can accommodate an appliance with a varying load cycle. An example of such an appliance is a washing machine, which applies higher electric loads during the wash and spin cycles, and lower electric loads during the fill and drain cycles. The interrupt switch 20 could have a power request button (not shown) that requests a reserve of power sufficient to allow the appliance with the variable loads to complete a cycle without applying a load that can trip the circuit breaker. The power request button instructs the generator monitor 10 to lower the reference outputs used in the calculation of some or all GAP levels. This reduction is equal to the maximum load applied by the appliance during its operating cycle. The power request causes the reduction in the reference outputs to continue for a time period equal to or greater than the appliance operating cycle. By reducing the reference outputs, the power is essentially denied to the other appliances on interrupt switches and subtracted from the GAP levels shown on the user displays, explained in detail below. This reduction in reference outputs therefore reserves the power needed by the appliance with the variable cycle. The appliance maximum loads could be measured by the interrupt switch, set manually by the user, or determined and preset by the manufacturer. Manufacturers of such appliances could also incorporate this feature into the on off switch of the appliance, allowing both functions to be implemented with the same switch. When a user wanted to operate the appliance, he pushes the power request button and turns on the appliance. The interrupt switch keeps the power to the appliance interrupted until it detects a GAP level sufficient to support the maximum load of the appliance. Upon detecting a sufficient GAP level, the interrupt switch sends the power request to the generator monitor and returns power to its appliance. Given the appliance has also been turned on, it begins its load cycle. Given this appliance operates at various load levels during the cycle, interrupt switches for this type of appliance do not incorporate the feature of interrupting power when the load is lower than the maximum continuous load observed. This embodiment of the interrupt switch for appliances with varying load cycles could either keep the switch closed until it notices no load from the appliance, or for an observed or set time period sufficient to allow for the completion of the appliance cycle.

An alternative embodiment of the system for the power request feature incorporates an extension to the length of the requested power reduction. The extended time period is sufficient for both the appliance cycle and for an initial system adjustment. For example, a washing machine with a 30 minute cycle might have its interrupt switch set to request a reduction in reference outputs for 45 minutes. The extra 15 minutes is intended for the other appliances and interrupt switches in the system to adjust to the lowered reference outputs prior to the start of the variable cycle appliance. The interrupt switch on the appliance closes within the set waiting period, provided enough appliances cycle off to allow the GAP level, to which the interrupt switch 20 is assigned, to increase to a level greater than the load identified for the appliance cycle. The interrupt switch transmitting the request needs to be monitoring a GAP level that is not affected by the power request, as doing so allows the appliance to take advantage of the power being reserved. This system provides a set time period for reducing the reference outputs regardless of how long it takes for the other devices in the system to adjust. For instance, assume the GAP levels are sufficient to support the appliance as soon as the power request button is pressed. In the example any time added to the duration of the appliance cycle when setting the power request duration, is essentially a waste of generator capacity. An additional decision process to address this potential waste can be to have the interrupt switch report a canceling of the power request after the appliance finishes the cycle. The end of the cycle can either be determined by a set time after the initial load was applied, or at the time when the power drawn through the interrupt switch is equal to zero.

To address the situation where low priority interrupt switches may interrupt power for extended periods, due to low GAP levels, a modified wait sequence could be applied. An interrupt switch 20 is programmed with a threshold period that is deemed unacceptable for the appliance to be without power. This could be any extended time period ranging from several minutes to a few hours. The threshold period could be a standard period considered appropriate for appliances in general or set for each appliance on the supporting interrupt switch. Once the interrupt switch 20 had remained open for this time period, it can execute a different and shorter wait period when it sensed an increase in GAP levels. This shortened wait period allows a low priority appliance that has been held without power for the extended period, access to an increased GAP level ahead of the higher priority appliances. One of many sequencing possibilities is to have all interrupt switches wait an initial time period followed by waiting the priority controlled time period. This initial time period that all interrupt switches normally wait can be a window of opportunity for the interrupt switch 20 that has been open for a time equal to or greater than the threshold period. As an example of this embodiment of the invention, assume the threshold time period is two hours. Further assume the initial time period is 10 seconds and that the wait period T3 is two seconds. The priority wait periods are calculated with the following equation or process:

$$10\ \text{Seconds} + (T3 \times \text{Priority}) = \text{wait period}$$

The wait period for interrupt switch 20, priority 1, is calculated as follows:

$$10\ \text{Seconds} + (2\ \text{Seconds} \times 1) = 12\ \text{Seconds}$$

The wait period for interrupt switch 20, priority 2, is calculated as follows:

$$10\ \text{Seconds} + (2\ \text{Seconds} \times 2) = 14\ \text{Seconds}$$

Following this process, the wait period for interrupt switch 20, priority 8 is calculated as follows:

$$10\ \text{Seconds} + (2\ \text{Seconds} \times 8) = 26\ \text{Seconds}$$

This wait period calculation, causes each interrupt switch 20 to be spaced 2 seconds apart after all interrupt switches wait the initial 10 seconds. Any interrupt switch 20, holding its appliance disabled for a period longer than the threshold period, evaluates the GAP levels and if sufficient, returns power to the appliance within the initial 10-second wait period. To continue this example of the present invention, if interrupt switch 20 with priority 8 is held interrupted for more than the threshold period, the interrupt switch 20 closes and returns power to the appliance during the initial 10 second wait period. In all scenarios, the interrupt switch 20 closes only if the last received GAP level is sufficient to support the appliance load at the end of the shortened wait period dictated by the interrupt switch 20 decision process. Additional sequencing can be used to help insure that two interrupt switches, that had been open for more than the threshold period, do not enable their appliances at the same moment in the initial wait period.

A unique time slot within the initial wait period could be identified based on the interrupt switch priority. For example, the interrupt switches that had exceeded the threshold period could wait their priority number times one second or:

IF Interrupt Period>Threshold Period

THEN 1 Second×Priority=Wait Period

In this scenario, each interrupt switch 20 having disabled power to its appliance longer than the threshold period, monitors a rise in GAP levels and closes the interrupt switch 20 after a number of seconds equal to its priority. In other words, interrupt switches 1, 2, 3, 4, etc. wait 1 second, 2 seconds, 3 seconds, 4 seconds etc. respectively, once the appliance disable period has exceeded the threshold. Those skilled in the art can identify numerous processes for wait sequences, all of which achieve the objective of the embodiment of the invention, of providing priority to appliances held without power for an extended period of time.

An optional feature for an interrupt switch 20 is a user warning system for when ever a critical, or threshold period, has been exceeded. In this scenario of the present invention, the interrupt switch 20 monitors the time it has been open, or held its appliance disabled, and when the critical time period is exceeded, a visual or audible notice is emitted as a warning to the occupants. This notice alerts the occupants of the home that the appliance has been held without power for the critical time period. Having been notified of the condition, occupants can turn off other appliances to lower the load on the generator until the GAP level rose to the point where the interrupt switch enabled, or closed to returned power to the appliance. With the return of power, the visual or audible notification stops.

An alternate embodiment of the invention is the application of the interrupt switch 20 to control appliances during times when utility power is strained or in short supply. Automatic appliances, or appliances with their own on/off control systems, can be wired on a separate circuit or circuits that are monitored in the same way the generator monitor 10, monitors the load on a generator. Interrupt switches support most, if not all the appliances on these circuits. The surge and continuous reference outputs are set similarly to the way they were set for the generator. The only difference is the reasoning used to determine the reverence outputs. The reference outputs are set at the maximum load level intended for the home or facility, given the short supply of utility power. A generator monitor 10 measures the momentary load on the circuits (step 157 of FIG. 3), calculates and transmits GAP levels in the same manner, but with the utility providing the power instead of the generator. This embodiment of the invention insures that the collective loads of the appliances on these circuits do not exceed the reference outputs resulting from the short supply of utility power. In turn the invention can be used to lower a home's peak load during times when utility power is in short supply or whenever a reason to conserve exists.

User Display

The user display 30 informs the user of the generator's current capability with respect to the appliances in the general area of the display. The user display 30 quickly identifies the appliances that can and cannot be activated with the current load on the generator. Essentially the user display 30 reports the Generator's Available Power levels, GAP levels, in terms of a Yes or No, for each of the appliances near the display. User displays 30 may also report the GAP levels in Watts, however the presentation of GAP levels relative to local appliance loads is the easier to interpret. Additional functionality in the present invention can be the ability to detect the closed and open transmissions from the interrupt switches 20. This informs the user of the appliances with and without power.

Figure 6A:
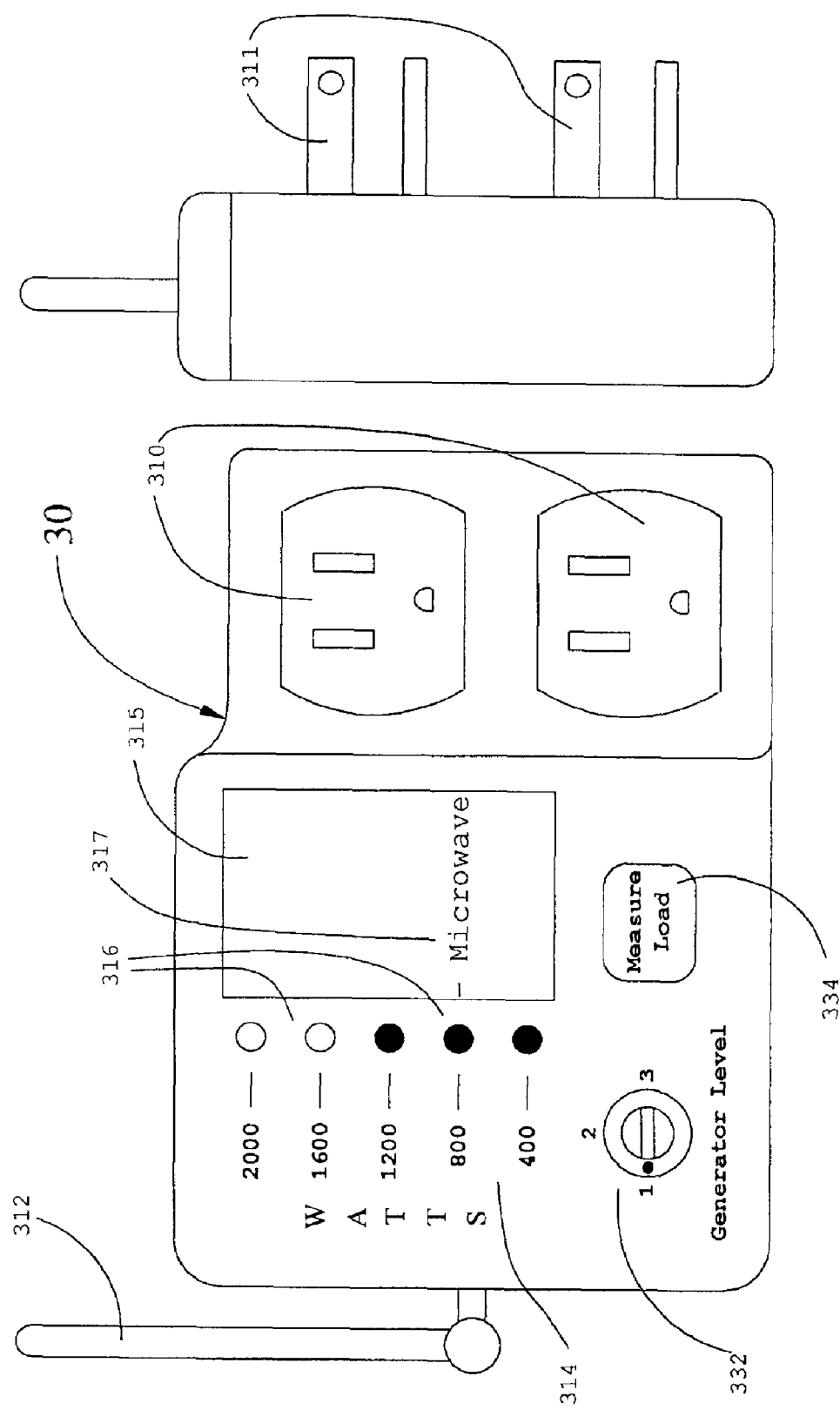
FIGS. 6a, 6b and 6c are views of user displays having varying levels of functionality and user-reporting capability, in accordance with the present invention.

FIG. 6a shows the front and left view of a user display 30 that plugs into the wall outlet via plugs 311 and provides two outlets 310 for plugging in local appliances. The user display 30 receives through its antenna 312 the selected GAP level via radio wave and translates it into a series of lights that indicate the generator's available power, GAP. The number of lights illuminated indicates the GAP level. The light sequence 314 creates a thermometer like presentation of the GAP level. In FIG. 6a the black circles 316 to the right of "WATTS" levels (WATTS spelled vertically) 400, 800 and 1200 represent lights that are on. The open circles 316 to the right of "WATTS" levels 1600 and 2000 represent lights that are off. The number of lights, or height of the lights, indicate the GAP level. The light sequence 316 on the user display 30 in FIG. 6a is reporting a GAP of 1200 Watts. In this particular display each light represents a 400-Watt increment of reported GAP, however any range of increments could be used within the scope of the present invention. The user display 30 has a rectangular area 315 to the right of the lights 316 intended to be an erasable writing area. This erasable writing area could be anything from a white board like surface with the intent of using an erasable marker, to an area sized for the application of a small piece of paper with an adhesive backing.

Figure 7A:
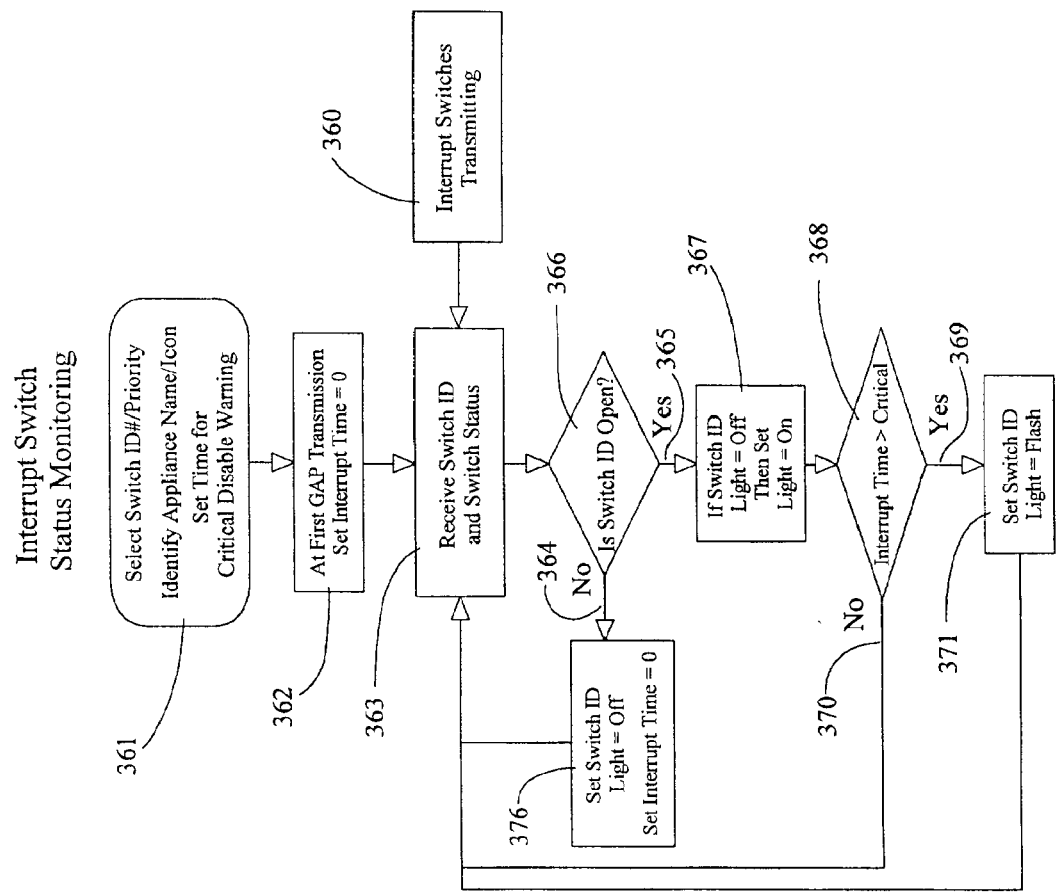
FIG. 7a is a flow diagram of the decision processes used to control user displays, in accordance with the present invention.
Figure 7A:
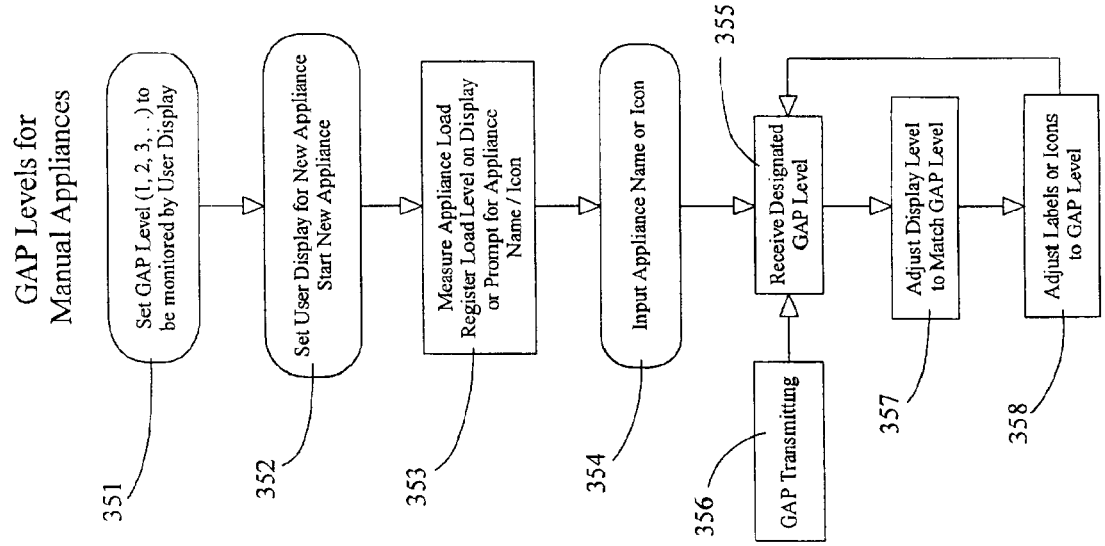

The user display 30 is designed to calibrate local appliances such as a toaster oven, microwave, hair dryer, curling iron, electric toothbrush, etc. as shown in the flow diagram of FIG. 7a. The user first assigns the user display 30 to monitor a GAP level with dial 332. The user then plugs the user display 30 into an outlet. The user calibrates appliances, local to the display, by plugging them into one of the outlets 310 and pressing the "Measure Load" button 334. The appliance is turned on at which point the user display 30 measures the appliance load. The display lights the appropriate number of lights 316 on the display 314 representing either the actual load or the next higher incremental load of the appliance. The lights remain lit for a short period of time, long enough for the user to note the light level and record the name of the appliance next to the highest light illuminated by the measurement of the appliance. For example, a microwave at a 700-Watt load is measured and rounded up by the user display 30 to the second light indicating the next highest load on the display of 800 Watts. The user can note on the writing area, next to the light 316 to the right of 800 Watts, the word "Microwave" 317, or whatever they chose to call the appliance. Once the appliance load level had been displayed for the time period noted, the user display 30 goes back to the normal mode of reporting the GAP levels via the light sequence noted earlier. This same process is repeated for all appliances in the area of the user display. Whenever the home was on the generator, the user checks the level of illuminated lights 316, relative to the level marked (317 on area 315) for the desired appliance, before activating the appliance. If the series of lights 316 is higher than the appliance mark 317, then the user knows the generator can support the additional load of the appliance without tripping the generator circuit breaker. If the light sequence 316 is below the appliance mark 317, the user knows that the appliance cannot be activated at that time, and that they must wait for other loads to cycle off, or be turned off, before there is enough power for the intended appliance. As other loads in the home or facility cycle off and on, or are manually turned off and on, the user display 30 updates the sequence of lights 316 based on the most recent GAP level transmission 17 from the generator monitor 10 in FIG. 1. Once the light sequence rises to the level of the desired appliance, the user knows the appliance can be activated without tripping the circuit breaker.

Figure 6B:
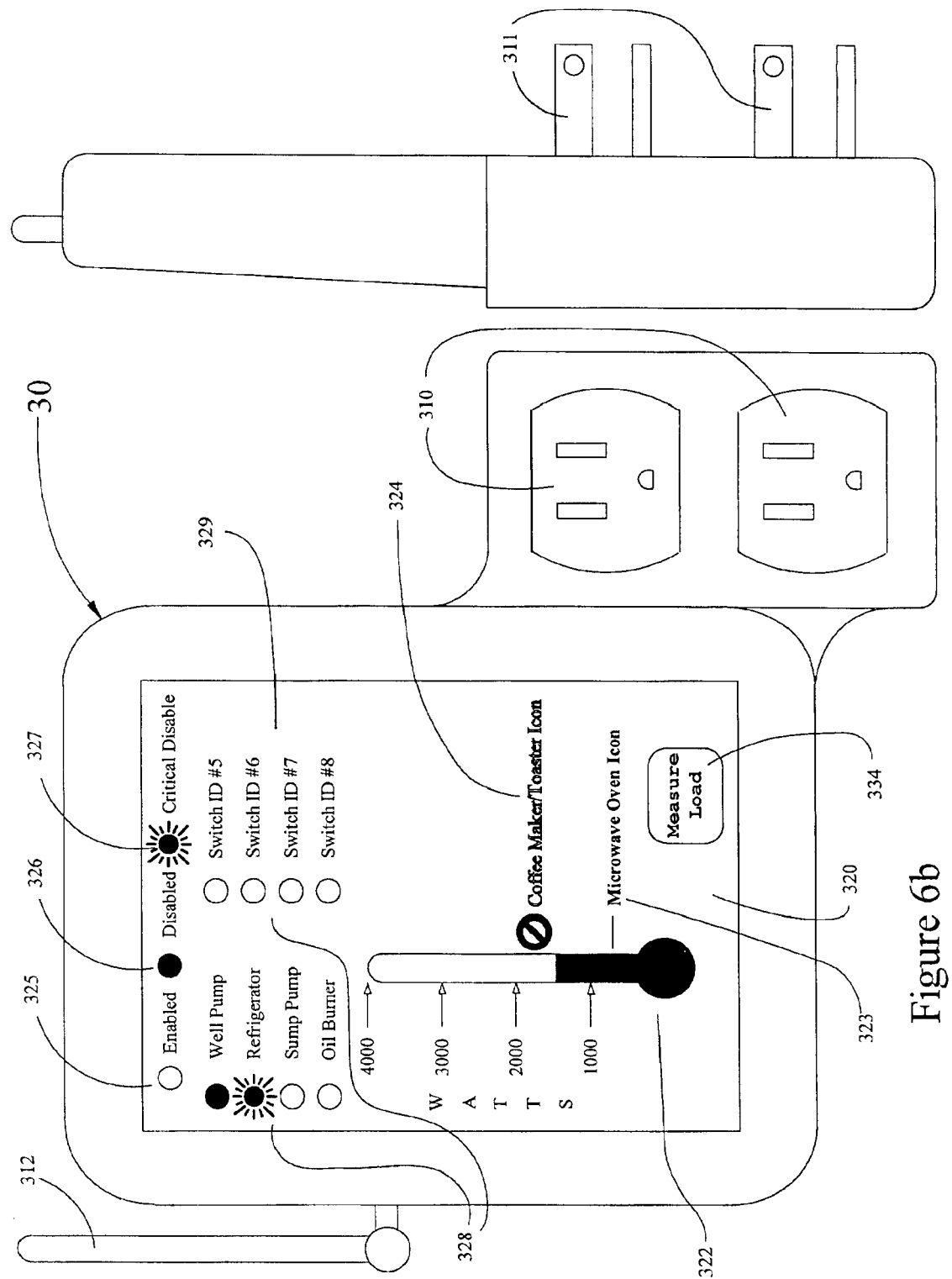

FIG. 6b is an enhanced version of the user display 30 in FIG. 6a. The user display 30 in FIG. 6b has an antenna 312, two plugs 311 and two outlets 310, as does the user display 30 in FIG. 6a. The user display 30 in FIG. 6b has a screen 320, which depicts the GAP level via a thermometer like graphical display 322. Other gauge like icons could be used as well, such as a pie chart or analog gauge. Independent of the gauge icon, the screen design allows a more continuous reading of the GAP level detected from the transmissions 17 in FIG. 1. In addition, the appliance names 323 and 324 appear on the display. The user display 30 could also use icons vs. text, to represent appliances on the display. The user display 30 can also change the appearance of the appliance names or icons based on whether or not the GAP level can support their loads. In FIG. 6b the Coffee Maker and Toaster Oven 324 (in this example, both having virtually identical load levels) cannot be supported by the current GAP level displayed on the thermometer graphic 322, and the Ø symbol appears prior to the Coffee Maker/Toaster Icon 324.

The font of 324 has also changed (different from the font of Microwave Oven Icon 323) to indicate such appliances cannot be activated with the current GAP level. The GAP level however is sufficient to support the load of the Microwave Oven 323. The user display 30 in turn displays 323 in a darker font and without the Ø symbol. There are numerous options for the presentation of appliance labels, names or icons, which can indicate the ability or inability of the GAP level to support the appliance load. The system of the present invention includes all text and graphical presentations of appliances, using identifiable differences indicating Yes or No based on process comparisons identified in the embodiment of this invention.

The user display 30 in FIG. 6b also reports the enable, disable and critical disable status of the interrupt switches 20 in the system. This process is presented in the second flow diagram on the right side of FIG. 7a "Interrupt Switch Status Monitoring". On this user display, lights or indicators 328 for the interrupt switches appear at the top one third of the display area. The indicators 325, 326 and 327 on the top row are examples of reference indicators, and are not reporting the status of an interrupt switch. Indicator 325 is that of an enabled appliance, 326 is an indicator of a disabled appliance and 327 is an indicator of an appliance that has been disabled for an extended and/or critically long period of time and is therefore a critical disable indicator. User displays can be designed with different numbers of interrupt switch indicators. In this example of the present invention, the user display 30 has the ability to monitor eight interrupt switches, which are the two vertical rows of four indicators 328 below the top horizontal row of example indicators 325, 326 and 327. The left vertical row of indicators 328 shows from top to bottom the "Well Pump" disabled, the "Refrigerator" critical disabled, the "Sump Pump" enabled and the "Oil Burner" enabled. The status displayed by each indicator on the screen is determined from the corresponding closed/open transmissions received from the assigned interrupt switch 20. The unique switch identifier can be the priority set on each interrupt switch 20, or can be assigned by the user, the installer, or built into the device by the manufacturer. If the switch priority is used as the switch ID the indicator assignment can be built into the user display 30 as shown on the vertical row of four indicators on the right side of the display 329, listing "Switch ID #5", "Switch ID #6", "Switch ID #7" and "Switch ID #8". If the interrupt switches use other methods of assigning unique identifiers, the user display 30 must have a method of inputting the unique identifier. The user display 30 also allows the substitution of default label ("Switch ID #__" in FIG. 6b) with a label for the appliance supported by the interrupt switch. In FIG. 6b, the label "Switch ID #1" has been changed to "Well Pump", "Switch ID #2" to "Refrigerator", "Switch ID #3" to "Sump Pump" and "Switch ID #4" to "Oil Burner". The user display 30 changes the appearance of the light or indicator next to the appliance name, based on the closed and open transmissions received from the interrupt switches.

The user display 30 in FIG. 6b can also be set with a time limit, or critical time for each interrupt switch. This time limit can be determined and set by the user or installer for each interrupt switch and is the time period the user considers acceptable for the appliance to go without power. Should the user display 30 detect an open switch transmission from the interrupt switch 20 for a time period greater than the critical time, the user display 30 changes the status indicator next to the appliance accordingly. In FIG. 6b for example, the interrupt switch 20 supporting the refrigerator, represented by the second light from the top of the left light row of 328, has been open for a time period greater than the assigned "critical time" and the indicator has been set to a flashing or "Critical Disable" state. Other forms of notification, either visual or audible, are also included within the embodiment of this invention.

FIG. 7A shows two flow diagrams for the user display 30 system. The first flow diagram on the left, "GAP Levels for Manual Appliances", represents the basic function of a user display 30. The second flow diagram on the right, "Interrupt Switch Status Monitoring", represents an optional process for monitoring interrupt switch 20 status. These two processes operate independently from each other.

On the left flow diagram of FIG. 7a, under the title "GAP Levels for Manual Appliances" the process starts in step 351 where the user display 30 is assigned to monitor one of the GAP levels transmitted via transmissions 17 from the generator monitor 10 and subsequently present the GAP level on the display 314 of FIG. 6a or 320 of FIG. 6b. Process 352 puts the user display 30 into appliance load measuring mode. With the user display 30 in measuring mode, the user plugs an appliance into the user display outlet and activates the appliance. The user display 30 measures the appliance load and displays the load level on the display in step 353. For the case of a user display 30 like that of FIG. 6a, the load measured is rounded up to the next higher light indicating the load level just above the measured appliance load. The user then writes in the name of the appliance next to the highest light lit by the appliance load measurement. For a user display 30 like that in FIG. 6b, the load can be displayed at the thermometer level equal to the measured load and the user is then prompted in step 354 to input the name or select an icon to represent the appliance that has just been measured. The name or icon then remains next to the measured load level.

At steps 356 and 355, in FIG. 7a, the generator is supplying power. The generator monitor 10 is transmitting the GAP levels. The user displays are receiving their designated GAP levels in step 356. The user display 30 adjusts the GAP level displayed to the user at step 357. For user displays like that in FIG. 6b, the recorded appliance names or icons are updated in step 358 of FIG. 7a to indicate/emphasize whether or not the generator can support the appliance at its current load. Once the user display 30 has been updated at step 358 the process returns to step 355 to receive the next GAP level transmission in step 356 from the generator monitor 10 and repeat the process through steps 357 and step 358.

The flow diagram to the right of FIG. 7a "Interrupt Switch Status Monitoring" is for the process of displaying the open or closed status for the interrupt switches in the system. This is an optional feature that appears in the user display 30 at the top third of the screen in FIG. 6b. This interrupt switch 20 status reporting process starts with assigning a more familiar name to the names of "Switch ID #1", "Switch ID #2", etc. in step 361. At installation, the user replaces the generic Switch ID #__ references with the appliance names being supported by the particular interrupt switch. FIG. 6b shows a display where "Switch ID #1" has been replaced by "Well Pump", "Switch ID #2" has been replaced by "Refrigerator", "Switch ID #3" has been replaced by "Sump Pump" and "Switch ID #4" has been replaced by "Oil Burner". Switch ID #s 5 thru 8 are either not installed in this system, or have not been given appliance names. Also in step 361 the critical disable time period is set for each interrupt switch ID #. At 362 the Interrupt time period is set equal to zero and the system clock begins recording the Interrupt time when GAP levels are first detected. Note when the power first returns from the backup generating source, the interrupt switches first open their switch, interrupting power and disabling their appliances. Therefore the initial time period that an appliance has been disabled starts at the very first GAP transmission.

The critical disable time is the time period the user determines is the longest time period the appliance can be disabled, or without power. The user can decide to use one average time period considered adequate for all appliances, or a specific time period appropriate for each appliance. The user may consider 40 minutes as critical for the oil burner to be without power and 30 minutes as critical for the refrigerator. Whatever the user preference, the user display 30 monitors the interrupt switch 20 signals, measures the time each is in disable mode and compares this time period to the critical time. When the time disabled exceeds the critical time, the user display 30 activates one or more audible or visual warnings to the user.

At step 363 of FIG. 7a, the user display 30 receives the Switch Open or Switch Closed transmissions from the interrupt switches in step 360. The control system continues to step 366 and identifies the Switch ID # from which an Open or Closed status has been received. For a Switch ID Open status, the process follows path 365 to step 367 where the indicator light for the Switch ID # is either turned "ON", or kept "ON", indicating to the user that the appliance supported by the interrupt switch 20 is without power and therefore disabled. The control system determines if the interrupt time is greater than the set critical disable in step 368 and if this critical disable time period has been exceeded, the process follows path 369, the indicator light changes its appearance (flash, change color, etc.) in step 371, to indicate to the user that the appliance supported by the interrupt switch 20 has been without power for a period longer than the critical time period. After step 371, or if the interrupt time is less than critical in the prior process step 368, the control system returns to step 363 to receive the next status transmission in step 360 from the interrupt switch 20 and repeat the cycle.

When a Switch ID Closed status occurs at step 366, the process follows path 364 to step 376 where the light or indicator for the Switch ID # on the user display 30 is turned "OFF" indicating to the user that the power has either been returned, or is still available to the appliance and the appliance is enabled. Process step 376 also sets the interrupt time to zero as power has been returned to the appliance.

Figure 6C:
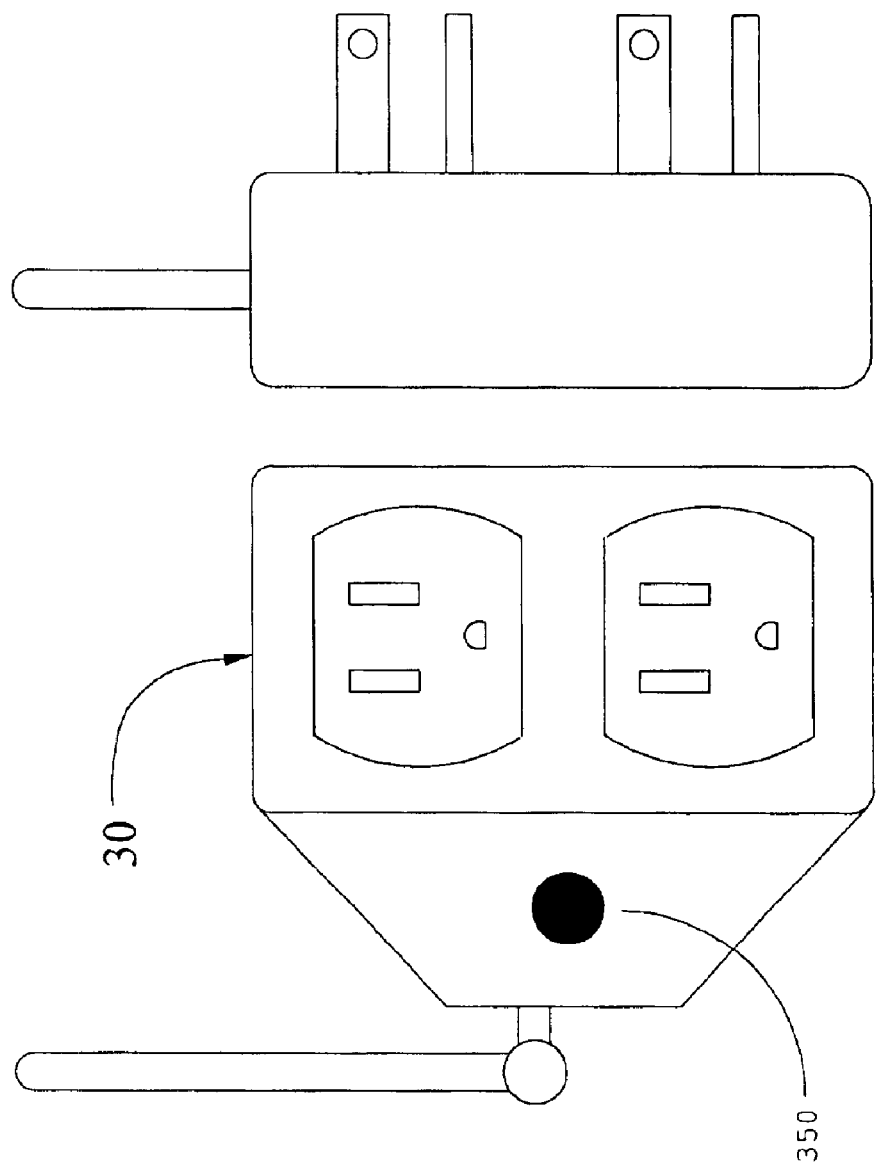

FIG. 6c is a simple and inexpensive embodiment of the present invention for the user display 30, in that it reports the GAP level as being above or below one set level with a single on/off indicator 350. This GAP level can be one power level that is relevant to most appliances local to the user display 30 or the load capability of the circuit in which it is plugged. The power level is either set by the manufacturer or set by the user with a dial (not shown).

Although FIGS. 6a, 6b and 6c depict user displays that plug into standard outlets, the present invention also includes alternate configurations of user displays with the same range of functionality, but built into or permanently integrated into wall outlets.

In its more user-friendly design, the user display 30 presents one GAP level to the user. More sophisticated embodiments of the present invention can present any or all transmitted GAP levels in a variety of numeric or graphical forms. However, presenting one GAP level, with a straightforward presentation of Yes or No for each local appliance, is the most efficient for the average user. This presentation of a single GAP level leads to the question of which GAP level should be translated into the display's light level, thermometer icon or other GAP level presentation. This question is addressed in part by the GAP level or "generator level" setting on the user display in FIG. 6a. The question is further addressed by determining whether the surge or continuous GAP level should be monitored. A conservative approach, is to monitor the GAPC, or GAP continuous transmissions from the generator monitor 10 and then measure the surge load when recording the load level on the display. Measuring the surge load of the appliance and then monitoring the Generator Available Power Continuous (GAPC) transmitted via transmissions 17 from the generator monitor 10, provides a safety margin equal to the surge capacity of the generator. Alternate embodiments of the invention can incorporate safety margins by using GAP levels that are calculated from lower reference outputs.

Figure 7B:
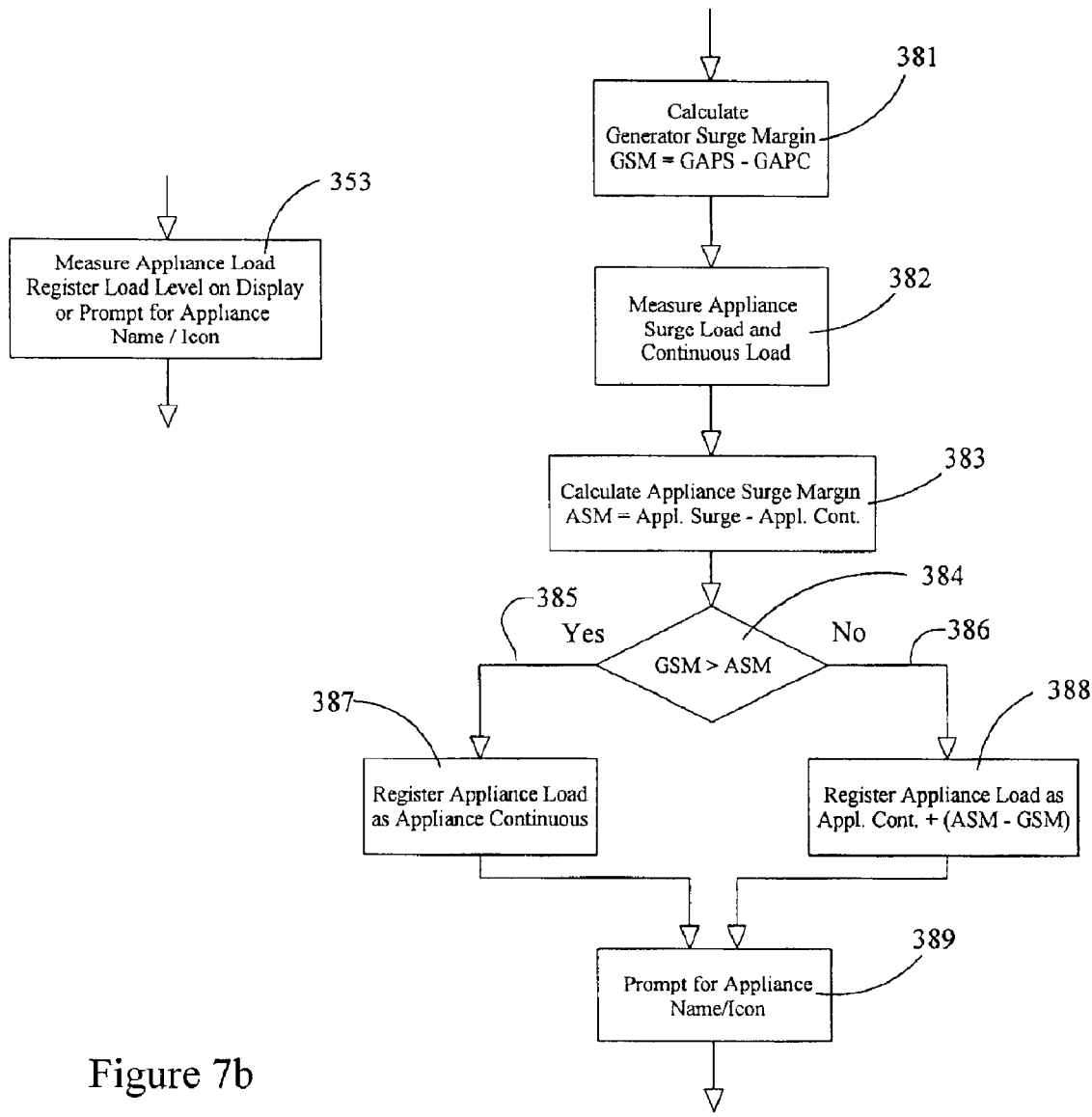
FIG. 7b is an enhanced alternative embodiment of one of the decision blocks of FIG. 7a, in accordance with the present invention.

An enhanced embodiment of the invention is a user display 30 that can determine which appliance load, surge, continuous or calculated load in-between, is best referenced when notifying the user. This process is shown in FIG. 7b as a replacement option to step 353 "Measure Appliance Load, Register Load Level on Display, and Prompt for Appliance Name/Icon" in FIG. 7a. This determination is based on a comparison of the appliance's surge and continuous loads, and the generator's surge and continuous capabilities. The user display 30 first calculates the generator surge margin by simply calculating the difference in the generator available power surge (GAPS) and generator available power continuous (GAPC) levels being transmitted from the generator monitor 10 in step 381 of FIG. 7b. Provided the generator is not about to be overloaded, this difference should be the actual difference in the two rated power outputs of the generator. When assigning a new load to an appliance, the user display 30 measures the surge and continuous load of the appliance in step 382. The process then calculates a surge margin in step 383 for the measured appliance. The appliance surge margin is calculated as the appliances measured surge load minus the measured continuous load in step 383 of FIG. 7b. The surge margin of the appliance is compared to the surge margin calculated for the generator in step 384. If the generator surge margin is larger than the surge margin for the appliance, the process proceeds along path 385, and the user display 30 presents the measured continuous load in step 387 on the user display 30 at the end of the measure load process. Generators with large surge margins cause this result more frequently. If the generator surge margin is smaller than the appliance surge margin in step 386, then the display monitor follows path 386 to calculate and present the result of step 388. In step 388 the measured continuous load of the appliance is added to the difference of the appliance surge margin ASM, minus the generator surge margin GSM.

These processes in the present invention make the user displays self-adjusting to both the generator's capabilities and the appliance load characteristics, and present one appliance load to the user for a yes or no indication as to whether or not the appliance can be activated with the current load on the generator. The user display 30 then prompts the user to label or assign an icon to the measured appliance, as shown in step 389.

The user display can also be equipped with the power reserve option similar to the option for the interrupt switch. This can be used to reserve power, again for appliances that use varying load levels during a cycle. An example of such an appliance is a dishwasher. Given the dishwashers are frequently either hard wired or have outlets and plugs in locations that are hard to access, the appliance can be managed with a power reserve function on a local user display. The user display can have a power request button that transmits an instruction to the generator monitor 10 telling it to reduce some or all of the reference outputs used to calculate GAP levels. In most embodiments of the invention, the instruction lowers all reference outputs with the exception of the reference output used to calculate the GAP level monitored by the user display requesting the power reserve. User displays could be designed to measure the maximum surge and continuous loads during a given appliance cycle, provided the appliance is plugged into the user display during this process, or the maximum surge and continuous loads of the appliance cycle can be input manually to the user display. The user presses the power reserve button, and waits until the user display shows enough power available to activate the appliance cycle. Once the user display showed sufficient GAP level, the user can activate or turn on the appliance. With the power reserve function the system reserves enough power for the duration of the appliance cycle.

An additional feature for drawing the users attention to a low GAP level is an outlet block or cover, activated by the user display 30, when ever the GAP level falls below a set point. Given the user display 30 informs the user of the available power, the decision to use or not to use power is left with the user. If the user forgets to check the display and turns on an appliance that overloads the generator, then the circuit breaker trips and the aforementioned frustrations occur. The physical block of the cover draws the user's attention to this low GAP condition and helps avoid oversight. The cover can be a simple mechanical device that covers the outlet opening, preventing the insertion of an appliance plug. There can also be an override for the user to activate causing the cover to retract and allow access to the outlet. An example of this embodiment of the invention is a user display 30 in the bathroom, where local appliances are an electric razor, electric toothbrush and a hairdryer. The razor and toothbrush are both under 100 Watts and present little danger of overloading a generator. However, the hairdryer has three power settings of 800 Watts, 1200 Watts and 1600 Watts. In this configuration the user may decide to set the user display 30 to trigger the outlet cover at a GAP level of 800 Watts. With this user determined setting, if the GAP transmission falls below 800 Watts, the cover closes. If a user tries to plug an appliance cord into the outlet, the cover prevents insertion of the plug. The blocking cover reminds the user to check the user display 30 for the appliances that can and cannot be activated. For a monitored GAP level of 500 Watts the outlet cover is closed and the user display 30 presents the electric razor and electric toothbrush as appliances that can be activated and the hair dryer as an appliance that can not be activated at any of its power levels (800 Watts, 1200 Watts or 1600 Watts). If the user wants to activate the electric toothbrush, checking the display shows there is enough power to support the load of the toothbrush. The user can select the over ride, the outlet cover retracts and the toothbrush can be plugged in and activated. If the user wants to activate the hairdryer, the user display 30 shows the low GAP level and the user knows that other appliances must be turned off before the hair dryer load can be activated. The user can turn off other loads until the user display 30 indicates a GAP level greater than 800 Watts at which time the user display retracts the outlet cover.

An additional feature of the user display 30 is to have an adjustable circuit breaker built into the user display's outlets. These circuit breakers can have their breaker level adjusted to the GAP level received, or to a lower level depending on design and intended safety margin. This causes the circuit breaker on the user display 30 to trip first when an appliance with a load in excess of the current GAP level is activated. Resetting the circuit breaker on the user display 30 is far easier than the breaker outside on the generator.

Another feature of the user display 30 can be to display the fuel level and time to empty for generators with fuel tanks, such as those powered by combustion engines or fuel cells using a stored supply of hydrogen, or any generator that incorporates a form of energy or fuel storage. Fuel storage status in terms of the quantity of fuel and the time to empty, can be transmitted by the generator monitor 10. The fuel level status can be added to the screen on the user display 30 for quick reference. Although remote fuel monitoring is common in many areas, the embodiment of this invention is unique in combining the fuel monitoring function with some or all of the other functions in the user display. By combining these features in one unit, the cost of each process is reduced and a more complete status of the homes power system is presented to the user on one screen.

In the embodiment of the invention it is also possible to control changes in reference outputs in the individual interrupt switches and user displays. This requires more manual settings on the part of the installer or user, but can be managed effectively. In this configuration, the interrupt switches and user displays execute adjustments to the calculated GAP levels. The GAP levels transmitted from the generator monitor 10 have an additional power level subtracted from the received GAP level, with the reduced GAP level used by either the interrupt switch 20 or the user display 30. This can be a way of assigning a unique priority for power to each automatic appliance and to the appliances in the area of the user display. GAP levels can also be changed based on time of day with the incorporation of clock functions in the interrupt switches and user displays. This allows the switching of power priorities during the day from one appliance to another. This embodiment of the invention can be a more complicated system to design, set up, and manage, however this functionality may be useful in situations where priorities are very detailed and users want an extensive level of control.

EXAMPLES

1. A home with a generator capable of 4500-Watt surge and 4000-Watt continuous. The home also has two automatic appliances that turn themselves on and off. The automatic appliances are the refrigerator and a blower motor on the oil burner. Overall, this system can function acceptably with the occupants of the home developing an intuitive feel for what the generator can and cannot support. This perception may result in an occasional tripping of the circuit breaker or non at all depending on the level of caution exercised by the occupants.

A minimal implementation of the invention makes an incremental but noticeable improvement in the utility derived from the generator. First a generator monitor 10 is installed on the generator and an interrupt switch 20 on the refrigerator. Given this is a minimal configuration, the only other automatic appliance in the home, a blower motor on the furnace, is not given an interrupt switch. User displays are installed in the kitchen and bathroom. Two sets of reference outputs are input into the generator monitor. The first reference outputs SR1 and CR1 are the rated surge and continuous capacities of the generator. The interrupt switch 20 on the refrigerator is set to monitor this first GAP level calculated from SR1 and CR1. The second set of reference outputs are for the user displays 30 and account for the heating system blower motor starting at any time. To do this the surge load of the heating system is subtracted from the rated surge capability of the generator resulting in the value SR2. To calculate CR2 the continuous load of the heating system is subtracted from the rated continuous capability of the generator. This causes the user displays to present a GAP or available power level to the occupants that allows for the heating system activating at any time.

Given this system is not a complete implementation on all appliances in the home; it is slightly less reliable. However, the assurance that the refrigerator cannot start when its load can trip the circuit breaker, greatly reduces the number of times the circuit breaker trips. Users also avoid tripping the circuit breaker if they simply check the user displays before activating appliances. Also, this system informs the user when they can activate an appliance as opposed to the user's conservative "feel" method. Running on the generator, there are many times when both the refrigerator and oil burner blower motor are cycled off causing most of the generators capacity to be unused. Under the conservative feel method, occupants might not activate the microwave or toaster oven due to past experiences when activating these manual appliances, tripped the circuit breaker, due to a condition where they were activated when both the refrigerator and the oil burner blower motor were running and applying their electric loads to the generator. This minimal implementation of one embodiment of the invention, enhances the utility and convenience of the generator by preventing one of the automatic appliances (refrigerator) from tripping the circuit breaker and by informing the users of the generator's momentary capacity.

2. A family has a camping generator, rated at 2300-Watts surge (GS) and 2000-Watts continuous (GC), and would like to support the appliances in Table 2-A below.

TABLE 2-A

| Automatic Appliance | Surge | Continuous |
|---|---|---|
| Clocks, night lights, system device loads, etc. | | 200-Watts |
| Well Water Pump | 1700-Watts | 650-Watts |
| Refrigerator | 2000-Watts | 700-Watts |
| Basement Sump Pump | 1700-Watts | 650-Watts |
| Heating System Motor | 900-Watts | 400-Watts |

In this implementation, the four automatic appliances in Table 2-A have interrupt switches 20 supporting them. There is one set of reference outputs, at the rated capacity of the generator, set on the generator monitor 10. The generator monitor 10 calculates and transmits one GAPS and one GAPC level. This configuration of the present invention, still encourages the family to use flashlights and candles, but provides water pressure, heat, refrigeration and a dry basement on a generator that otherwise could only support one or two of the appliances listed above.

Surge Reference 1 (SR1) and Continuous Reference 1 (CR1) is calculated as follows:

SR1=GS=2300 Watts

CR1=GC=2000 Watts

The generator monitor 10 has SR1 set to 2300-Watts and CR1 set to 2000-Watts. The generator monitor 10 is then installed in the sub panel socket.

This configuration includes a critical time monitor to the refrigerator's interrupt switch. Given the small 300-Watt difference between the generator surge capacity and the refrigerator surge load, the refrigerator may be held disabled for the duration of the power outage if so much as 310-Watts of clocks and lights are running. If the interrupt switch 20 were equipped with an audible alarm that signaled when the refrigerator had been disabled for the identified critical time, the homeowner is alerted and can turn off sufficient lights or appliances to increase the GAP levels sufficiently to cause the interrupt switch 20 supporting the refrigerator, to enabled the refrigerator.

Assuming the automatic appliances above are listed in order of the homeowner's priorities, with running water being the first and most important, refrigeration second, a dry basement third and heat being last, the interrupt switches for these four appliances are given the priority settings in the table below.

| Automatic Appliance | GAPS & GAPC Level | Interrupt Switch Priority (ISP) |
|---|---|---|
| Well Water Pump | 1 | 1 |
| Refrigerator | 1 | 2 |
| Basement Sump Pump | 1 | 3 |
| Heating System Motor | 1 | 4 |

Once the interrupt switches have had a few appliance cycles to determine the surge and continuous loads of their appliances, the system is fully installed and operational.

3. In this example user displays are added to example 2. This allows the occasional use of a hairdryer, toaster or microwave.

Given the generator's capacity is small relative to the total load, SR1 and CR1 are again set at the generator's capacity. As in Example 2, just one set of GAP levels is used. The kitchen and bathroom each have a user display. When programming the user displays the surge and continuous loads in Table 3-A below, are measured and stored with appropriate labels or icons:

TABLE 3-A

| Manual Appliance | Programmed On Display in | Surge | Continuous |
|---|---|---|---|
| Hairdryer on Low | Bathroom | 600 Watts | 600 Watts |
| Hairdryer on Med | Bathroom | 1200 Watts | 1200 Watts |
| Hairdryer on High | Bathroom | 1600 Watts | 1600 Watts |
| Toaster | Kitchen | 1000 Watts | 1000 Watts |
| Microwave | Kitchen | 700 Watts | 700 Watts |

Table 3-B below shows the GAP levels resulting from just one of the Automatic Appliances running at once. By looking at the surge and continuous loads of the other appliances compared to the GAPS and GAPC levels, it can be determined which of the other appliances can start with a given appliance running. This calculation is basically the continuous load of the appliance subtracted from the SR1, resulting in GAPS and the same continuous load of the appliance subtracted from the CR1, resulting in GAPC.

TABLE 3-B

| Automatic Appliance | Surge Load | GAPS | Continuous Load | GAPC |
|---|---|---|---|---|
| Clocks, night lights etc. | N/A | 200-Watts | N/A | |
| Well Water Pump | 1700-Watts | 1650-Watts | 650-Watts | 1350-Watts |
| Refrigerator | 2000-Watts | 1600-Watts | 700-Watts | 1300-Watts |
| Basement Sump Pump | 1700-Watts | 1650-Watts | 650-Watts | 1350-Watts |
| Heating System Motor | 900-Watts | 1900-Watts | 400-Watts | 1600-Watts |

Table 3-B above shows that the interrupt switch 20 on the heating system is closed, enabling the heating system, when just one of the other automatic appliances is operating. This is because the heating system start up load of 900 Watts surge, is smaller than all the GAPSs, and its continuous load of 400 Watts is smaller than all the GAPCs. Alternately if the heating system is running, then the interrupt switches 20 on the well water pump and sump pump are closed, enabling them and allowing them to activate if needed. However, the interrupt switch 20 on the refrigerator disables the refrigerator, given its surge is 2000-Watts, if the heating system motor or any of the other automatic appliances are running and applying their continuous load to the generator.

To evaluate which manual appliances have "Yes" or "Go" indications on the user display, the manual appliance surge loads in Table 3-A are compared to the GAPS levels in the Automatic Appliances in Table 3-B. It can be seen that any one of the manual appliances in Table 3-A can be turned on with any one of the automatic appliances running in Table 3-B. This is because the lowest GAPS of the manual appliances in table 3-B (1600 Watts for the refrigerator) are equal to or greater than the highest surge load of the highest manual appliance in the Table 3-A (hairdryer on high at 1600 Watts).

4. In this example the generator capacity is increased and two appliances are added to the system. The two appliances are an electric hot water heater and a washing machine. Interrupt switches are not configured to support the water heater or the washing machine. The electric loads of the other appliances are the same as those in example 3.

The generator surge capability is increased to 7000 Watts and the continuous capability to 6500 Watts. The electric hot water heater has a surge and continuous load of 3000 Watts. The electric hot water heater is on a timer that allows it to operate from 3:00 am to 6:00 am and from 6:00 pm to 8:00 pm. The washing machine has a maximum surge load of 1600 Watts and a maximum continuous load of 500 Watts. The washing machine also has a 30-minute wash cycle.

Given the electric hot water heater does not have an interrupt switch, the values of SR1 and CR1 must compensate for the load by changing with time of day. A 15-minute system adjustment period is added to the beginning of these time periods. There is a 5-minute safety period added to the end of the cycle to allow for potential timing errors between clocks in the system. Therefore from 2:45 am–6:05 am and from 5:45 pm–8:05 pm, the values of SR1 and CR1 are:

$SR1 = GS-3000$ Watts $=7000$ Watts$-3000$ Watts $=4000$ Watts $CR1 = GC-3000$ Watts $=6500$ Watts$-3000$ Watts $=3500$ Watts Whereby GS and GC are the rated generator surge and continuous capacities, respectively. Based on the calculations above, the generator monitor 10 had SR1 set to 4000 Watts and CR1 set to 3500 Watts during these time periods.

For those times outside the hours 2:45 am–6:05 am and 5:45 pm–8:05 pm, the values of SR1 and CR1 are:

$SR1=GS=7000$ Watts $CR1=GC=6500$ Watts

The generator monitor 10 has $SR_1$ set to 7000 Watts and CR1 set to 6500 Watts during these alternate time periods.

The refrigerator and heating system is given a low priority during the hours of 6:00 am and 8:00 am when the family is taking showers, operating the hair dryer and cooking breakfast with the stove, toaster oven and microwave. The reference outputs for the GAP levels (GAPS2 and GAPC2) monitored by the interrupt switches supporting the refrigerator and heating system, have their reference outputs lowered by the generator monitor 10, allowing them to activate only when most other appliance loads are turned off. During this time period from 6:00 am to 8:00 am, the generator monitor process changes the surge reference output 2 (SR2) to 3000 Watts and the continuous reference output 2, (CR2) to 2000 Watts. This causes the GAP levels to be calculated as follows:

$GAPS_2=SR_2-$Momentary Load $GAPS_2=3000-$Momentary Load $GAPC_2=CR_2-$Momentary Load $GAPC_2=2000-$Momentary Load Note that when the momentary load is greater than 1000 Watts, the GAPS2 are low enough for the refrigerator interrupt switch 20 to hold the refrigerator disabled. When the momentary load is greater than 1600 Watts, the GAPC2 is low enough for the heating system interrupt switch 20 to hold the heating system disabled. Granted this is not advised for an extended period of time, but for the two hours the family wants most of the generator power for other appliances, they may choose to consciously reduce the number of times they open the refrigerator door and get by with potentially depriving the refrigerator of power for this two-hour period. Independent of the appropriateness of the time period for keeping a refrigerator disabled, or any other appliance disabled, the example demonstrates how priorities can be set and changed with time of day to allocate generator power in accordance with the user's preferences.

Note, once the morning time period had passed, SR2 can be set to a higher level, perhaps 6000 Watts and CR2 to 5000 Watts, or even set SR2 and CR2 to the full rated capacity of the generator.

Assume the homeowner decides the percentage of total generator power used by the simultaneous running of both the hot water heater and the washing machine is too high and prevents the usage of other appliances, deemed more important by the user. Also assume the user does not want to set the GAP level for the washing machine to change with time of day. For this scenario, an interrupt switch with a power request button is installed in the laundry room. The power request button is set to request a lowering of reference outputs by 1600 Watts for the 30-minute wash cycle. This lowering of reference outputs occurs once the interrupt switch senses the GAP levels have been sufficient for a period greater than the wait period dictated by the interrupt switch priority. The interrupt switch then transmits the request for reference outputs to be lowered just prior to closing the switch, enabling the washing machine and allowing it to start its cycle. To comply with the homeowner's intent of preventing the washing machine from running simultaneously with the electric hot water heater, the reference outputs are set just below the combined load of both the washing machine and the water heater. With a washing machine surge load of 1600 Watts and an electric hot water heater load of 3000 Watts, the combined total is 4600 Watts. Therefore, the reference output for the washing machine GAP level is set just below this total, at 4500 Watts. This reference output being set 100 Watts lower than the required surge load of both the washing machine, and the water heater, prevents the user display 30 from reporting sufficient power for the washing machine. Therefore in this configuration, the interrupt switch on the washing machine interrupts power whenever the water heater is running. Once the water heater cycles off, at the end of its timed cycle, the GAP level monitored by the washing machine interrupt switch is allowed to rise to the point where the interrupt switch returns power to the washing machine.

5. Assume a community with local power generation. This community has 5 fuel cells, each supporting 100 homes for a total community of 500 homes. Assume that the power from any or all of the 5 fuel cells can be shared by, or distributed as needed to any or all of the 500 homes. With all 5 fuel cells running, there is enough power to meet the community's peak power demand. If one or more of the fuel cells is disabled, the 500 homes need to conserve power usage as they are now being powered by the remaining 4 or less fuel cells. With all 5 fuel cells operating and on-line the power capability is given a rating of 5. With one fuel cell disabled, the power capability rating is 4, with two fuel cells disabled the power capability rating is 3, etc. The homes in this community are all equipped with generator monitors on the power lines supplying their homes. If one or more fuel cells become disabled, the associated power capability rating is transmitted to all the generator monitors in the communities. The capability ratings cause the generator monitors to be set with reference outputs that reflect the homes share of the current generating capacity. The generator monitors 20 in the homes can then use the reference outputs to calculate GAP levels and transmit them to the other devices in the home. In this example, a system of the present invention is used to manage electricity usage in a reduced utility power condition as opposed to the reduced power coming from a home's individual generator.

I claim:

1. An electric power monitoring system comprising:
a source monitor for measuring momentary power output of an electric source supplying electric power to a power distribution system having at least one electric load;
means for comparing the momentary power output with a reference load capability for the electric source to determine the ability of the electric source to support additional load, and for transmitting load capability data based on the load capability; and
at least one load control for receiving the transmitted load capability data and controlling the supply of power to the at least one corresponding electric load based on the load capability data.

2. The electric power monitoring system of claim 1 wherein the reference load capability is determined based on at least one of a reference surge load and a reference continuous load.

3. The electric power monitoring system of claim 2 wherein the reference surge load or reference continuous load are programmable according to time of day.

4. The electric power monitoring system of claim 1 wherein the source monitor comprises multiple source monitors, and wherein the means for comparing compares the momentary power output with multiple reference load capabilities, and transmits multiple load capability data to respective multiple loads according to unique load identifiers.

5. The electric power monitoring system of claim 1 wherein the reference load is adjusted in accordance with electric source drive capability, electric source efficiency, or predetermined load patterns, during a power source initialization.

6. The electric power monitoring system of claim 1 wherein the at least one load control comprises an interrupt switch for interrupting the supply of power to the electric load when the transmitted load capability is less than a predetermined level.

7. The electric power monitoring system of claim 6 wherein the interrupt switch interrupts the supply of power for an interrupt time period upon the return of power following a power failure condition.

8. The electric power monitoring system of claim 7 wherein the interrupt time period is set to delays the return of power for a period of time for the purpose of reducing the total sudden load on the main power source at initial power return.

9. The electric power monitoring system of claim 6 wherein the interrupt switch further monitors electric power levels drawn by the at least one electric load and interrupts the supply of power to the electric load when the transmitted load capability is less than the monitored power levels of the at least one electric load.

10. The electric power monitoring system of claim 6 wherein the interrupt switch delays interruption of the supply of power until the electric load has completed an operation cycle.

11. The electric power monitoring system of claim 6 wherein the interrupt switch delays interruption of the supply of power until the electric load has completed an operation cycle if the electric load's continuous load level is substantially equal to a predetermined level of normal operation.

12. The electric power monitoring system of claim 6 wherein the interrupt switch further comprises a signal transmission system that transmits interrupt switch identifier data and interrupt switch status data.

13. The electric power monitoring system of claim 12 wherein a switch open status is transmitted when the switch is open and wherein a switch closed status is transmitted just prior to closing the switch for transmitting status data when the corresponding electric load is without power and thereby unable to emit any electromagnetic interference that would compromise the interrupt switch status transmission.

14. The electric power monitoring system of claim 1 further comprising a user interface indicating a condition of whether the electric source has sufficient load capability for supplying electrical power to the at least one electric load.

15. The electric power monitoring system of claim 14 wherein the user interface receives and displays data from the at least one load control related to the electric load level.

16. The electric power monitoring system of claim 14 wherein the user interface interprets a first difference in surge load capability in excess of the continuous load capability and compares this difference to a second difference between a start up surge and continuous load of electric load and determines a power level reported to the user on the interface.

17. The electric power monitoring system of claim 12 further comprising a user interface for reporting the interrupt switch status data to a user.

18. The electric power monitoring system of claim 17 wherein the user interface measures the time period an interrupt switch is open and reports data related the time period to a user.

19. The electric power monitoring system of claim 17 wherein the electric source is a fuel-based generator, wherein the source monitor measures fuel level in a fuel tank for the generator, and wherein fuel data based on the fuel level is provided on the user interface.

20. The electric power monitoring system of claim 19 wherein the user interface measures total electric power consumed by the power distribution system, measures the fuel consumed for generating the power, and presents a cost per energy unit for comparison with current or available utility rates.

21. The electric power monitoring system of claim 1 wherein the at least one load control comprises a variable circuit breaker that adjusts dynamically to the transmitted load capability.

22. The electric power monitoring system of claim 1 wherein the at least one load control comprises an outlet adapter that closes an outlet to an appliance plug when load capability from the electric source is below a predetermined level.

23. The electric power monitoring system of claim 1 wherein the load capability is determined based on a reference output intended to reduce power consumption during peak load or reduced power conditions.

* * * * *